US010244495B1

(12) United States Patent
Thong et al.

(10) Patent No.: US 10,244,495 B1
(45) Date of Patent: Mar. 26, 2019

(54) SYSTEMS AND METHODS FOR SYNCHRONIZATION SIGNAL TIMESLOT RESELECTION FOR SYNCHRONIZATION TARGET SELECTION IN NETWORKS

(71) Applicant: Hong Kong Applied Science and Technology Research Institute Co., Ltd., Shatin, New Territories (HK)

(72) Inventors: Wilson Wang Kit Thong, Tsuen Wan (HK); Victor Man Wai Kwan, Shatin (HK); Elaine Jihui Zhang, Shatin (HK); Jie Chuai, Tai Po (HK); Ching Hong Leung, Tai Po (HK); Yan Lam Lee, Kowloon (HK); Eric Kong Chau Tsang, KLN (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 15/718,492

(22) Filed: Sep. 28, 2017

(51) Int. Cl.
*H04W 56/00* (2009.01)
*H04W 72/04* (2009.01)

(52) U.S. Cl.
CPC ...... *H04W 56/001* (2013.01); *H04W 72/0446* (2013.01)

(58) Field of Classification Search
None
See application file for complete search history.

(56) References Cited

U.S. PATENT DOCUMENTS

| 5,844,894 A * | 12/1998 | Dent ............... H04J 13/00 370/330 |
| 7,088,677 B1 * | 8/2006 | Burst, Jr. ......... H04L 47/10 370/229 |
| 8,374,163 B2 | 2/2013 | Horn et al. |
| 8,879,478 B2 | 11/2014 | Vujcic |

(Continued)

FOREIGN PATENT DOCUMENTS

| CN | 101599881 A | 12/2009 |
| CN | 105657815 A | 6/2016 |
| WO | WO-2017/095882 A1 | 6/2017 |

OTHER PUBLICATIONS

International Search Report and Written Opinion issued for PCT/CN2017/106757; dated Jul. 6, 2018; 9 pages.

*Primary Examiner* — Candal Elpenord
(74) *Attorney, Agent, or Firm* — Norton Rose Fulbright US LLP

(57) ABSTRACT

Methods and systems which provide for synchronization target selection by configuring a network device to reselect a synchronization signal transmission timeslot for synchronization target searching by the network device are described. Synchronization signal timeslot reselection may provide for downgrading a current stratum index to an artificial stratum index that does not accurately indicate a number of hops between the network device and a global synchronization source to allow for selection of available synchronization targets with stratum indices that are higher than or equal to the network device's stratum index without causing a synchronization loop. A synchronization signal pattern cycle structure having synchronization signal (Continued)

timeslots organized into multiple subcycles for accommodating synchronization signal timeslot reselection is utilized according to embodiments.

26 Claims, 10 Drawing Sheets

(56) References Cited

U.S. PATENT DOCUMENTS

| | | |
|---|---|---|
| 9,001,742 B2 | 4/2015 | Palanki et al. |
| 2002/0027525 A1* | 3/2002 | Pietila .................... G01S 19/28 |
| | | 342/357.67 |
| 2009/0316621 A1* | 12/2009 | Lane .................... H04B 7/2125 |
| | | 370/326 |
| 2014/0071897 A1 | 3/2014 | Palanki et al. |
| 2015/0006633 A1 | 1/2015 | Vandwalle et al. |
| 2015/0327261 A1 | 11/2015 | Thubert et al. |
| 2016/0057719 A1 | 2/2016 | Centonza |

\* cited by examiner

SYSTEMS AND METHODS FOR SYNCHRONIZATION SIGNAL TIMESLOT RESELECTION FOR SYNCHRONIZATION TARGET SELECTION IN NETWORKS

CROSS-REFERENCE TO RELATED APPLICATIONS

The present application is related to co-pending U.S. patent application Ser. No. 15/673,105 entitled "SYSTEMS AND METHODS FOR SYNCHRONIZATION TARGET SELECTION IN WIRELESS NETWORKS, filed Aug. 9, 2017, the disclosure of which is hereby incorporated herein by reference.

TECHNICAL FIELD

The present invention relates generally to wireless communication technology, and more particularly to synchronization signal timeslot reselection techniques for facilitating selection of synchronization target network devices for providing synchronization signals in time synchronized networks.

BACKGROUND OF THE INVENTION

The use of digital data communication has become widespread to the point of nearly being ubiquitous. For example, digital communications are routinely implemented in providing data communications in various systems, such as computer network systems (including personal area networks (PANs), local area networks (LANs), metropolitan area networks (MANs), wide area networks (WANs), the Internet, etc.) and communication network systems (including the public switched telephone network (PSTN), cellular networks, cable transmission systems, etc.).

Time synchronization may be employed in such networks for various uses, such as determining location, proximity, or speed. Moreover, a need for time synchronization may arise out of the reality that hardware clocks are not perfect, wherein variations in oscillators and/or drift in the clock signals may result in durations of time intervals of events not being the same between network nodes. Time synchronization can be an important issue in network communications, wherein uplink/downlink interference may be avoided with high synchronization accuracy. For example, a network may operate in synchronous mode (e.g., time-division duplexing (TDD) mode), in which transmissions by different network devices (e.g., base stations, access points, user equipment, mobile devices, etc., performing wireless communications utilizing various forms of receivers, transmitters, and/or transceivers) within the network are aligned in time and/or frequency. In such a synchronous network, synchronization of the network devices is of utmost importance because if a network device is not accurately synchronized to the rest of the network (e.g., synchronized to other network devices), its transmissions will not be aligned with the transmission of the other network devices. This misalignment may result in network degradation, as the misaligned network device may cause, when transmitting, interference to other network devices. Also, the misaligned network device may be subjected to interference when other network devices are transmitting. In 4th Generation (4G)/long term evolution (LTE) wireless communication system, for example, the 3GPP TS36.133 standard requires that time synchronization of network devices of a TDD network be within 3 us.

Several techniques exist for synchronizing the network devices. For example, synchronization of network devices may be accomplished by providing the network devices with synchronization signals, which the network devices can use for performing the synchronization. Such synchronization signals may be provided to the network devices from a common synchronization source (hereinafter referred to as "global synchronization source").

Under good backhaul conditions, for example, with operator controlled fiber or Ethernet, synchronization signals provided in accordance with IEEE 1588 v2 can provide sub-microsecond level accuracy. However, such good backhaul conditions may not always be possible. In particular, backhauls over cable and digital subscriber line (DSL) modems have significant jitter and delay variations. Moreover, IEEE 1588 server or switch support must be provided within the network in order to provide the requisite backhaul.

In another technique in which synchronization signals are utilized for synchronizing the network devices, network devices (e.g., enhanced Node-B (eNB), access point, mobile device, etc.) that include a global positioning system (GPS) receiver and can acquire the GPS synchronization signals. However, GPS receivers often only reliably receive GPS reference signals when the device is provided with a relatively unobstructed view of the sky (e.g., disposed outdoors, in an area free of shadowing from terrain, foliage, and structures, etc.), and thus often does not provide a reliable synchronization technique for many network devices (e.g., home eNB (HeNB), femtocell, etc.).

Network listening provides a technique in which synchronization signals are utilized for synchronizing the network devices that can be used in scenarios where GPS and IEEE 1588 v2 do not work. In situations where the network listening technique may be advantageous, a particular network device may not be able to receive, or reliably receive, synchronization signals from the global synchronization source (e.g., GPS reference signals). For example, network devices disposed indoors, in an area shadowed by tall buildings or terrain, etc., may be unable to reliably receive GPS reference signals for establishing synchronization with other network devices. A network device that is unable to reliably receive synchronization signals from a global synchronization source may, nevertheless, be within communications range of other network devices, wherein one or more such network devices may be capable of receiving synchronization signals from the global synchronization source, and thus may employ network listening techniques to obtain relayed or retransmitted synchronization signals. For example, network devices that are able to receive, or reliably receive, synchronization signals from the global synchronization source may transmit (e.g., broadcast) synchronization signals for use by the network devices that are unable to receive, or reliably receive, the synchronization signals from the global synchronization source. Accordingly, the network devices that are unable to reliably receive synchronization signals from the global synchronization source are able to nevertheless synchronize their communications to the other network devices by using a synchronization signal broadcast by another network device (the particular network device broadcasting the synchronization signal selected/used by another network device being referred to herein as a "synchronization target" and a "parent network device" for the network device receiving the broadcast synchronization signal and the network device using the broadcast synchronization signal being referred to herein as a "child network device"). One of the advantages of the network listening technique is that no extra requirement is required on backhaul and it can be applied in both out-door and in-door conditions.

It should be appreciated that the relaying of synchronization signals in accordance with a network listening technique can be used for any number of network devices that cannot reliably receive synchronization signals from the global synchronization source but are within communications range of other network devices that are able to reliably receive synchronization signals from the global synchronization source. Moreover, child network devices reliably receiving synchronization signals transmitted from a parent network device, and thus establishing network synchronization, may themselves transmit (e.g., broadcast or rebroadcast) synchronization signals such that other network devices (child network devices of higher (worse) stratum level of a synchronization tree structure) that are within communications range of the first mentioned child network devices are able to receive synchronization signals. In this case, the higher (worse) stratum level child network devices receiving these synchronization signals can use the lower (better) stratum level child network devices transmitting synchronization signals as synchronization targets and the child network devices transmitting these synchronization signals are themselves parent network devices to the higher (worse) stratum level child network devices receiving the synchronization signals. Accordingly, although various network devices may not receive the synchronization signals directly from the global synchronization source, all of the network devices may nonetheless be synchronized to the other devices in the network via their respective synchronization target, either by synchronizing to the global synchronization source using synchronization signals transmitted by a network device receiving the synchronization signals directly from the global synchronization source or using synchronization signals relayed by one or more network devices.

As can be seen from the foregoing, in some instances of a time synchronized network, a synchronization target utilized by any particular child network device may itself not be receiving synchronization signals directly from the global synchronization source, but instead may be receiving synchronization signals transmitted by an intermediate, intervening child network device serving as a synchronization target. This interconnection of the various network devices to each other as parent and child network devices results in a synchronization target hierarchy, in the form of a synchronization tree with the various network devices as network devices of the tree, for providing synchronization signals to the variously disposed network devices. Network devices in such a synchronization tree may be children network devices of their respective synchronization target parent network devices, and synchronization target parent network devices may be parent network devices to their respective children network devices. Furthermore, a network device may have a child network device that itself has one or more child network devices. Such child network devices (i.e., the initial child network device and any child network devices thereof) are said to be downstream of the parent network device, and are said to be downstream children of the parent network device.

In accordance with the aforementioned synchronization tree structure, some network devices may be directly receiving synchronization signals from the global synchronization source and thus, may be said to be one hop away from the global synchronization source. These network devices are thus said to have a synchronization tree stratum level of one. Network devices receiving synchronization signals transmitted from a synchronization target in the synchronization tree are said to be more than one hop away from the global synchronization source due to the synchronization signal being provided by one or more intermediary, intervening network devices, wherein the number of hops, and correspondingly their synchronization tree stratum level, depends upon the network device's placement in the synchronization tree hierarchy. Accordingly, a stratum level of such a network device indicates the number of hops that exist between the network device and the global synchronization source of the network.

A stratum index of a network device may be used to indicate the particular stratum level of the network device. Thus, network devices that are receiving synchronization signals directly from the global synchronization source may be said to have a stratum level of 1, and may be configured with a stratum index of 1. A child network device using a stratum level 1 network device as synchronization target may be said to be two hops away from the global synchronization source, i.e., one hop from the device to the synchronization target, and another hop from the synchronization target to the global synchronization source. Such a child network device may thus be configured with a stratum index of 2. A further child network device using a stratum level 2 child network device as synchronization target may be said to be three hops away from the global synchronization source, and may be configured with a stratum index of 3, and so on. Generally, the stratum index of a network device may be equal to the stratum index of its synchronization target plus a non-zero, positive number. The non-zero, positive number may indicate a distance between the network device and its synchronization target. For example, the stratum index of a network device may be equal to the stratum index of its synchronization target plus the distance, in hops, between the network device and its synchronization target.

In operation of a wireless network, any particular network device may fail. However, it is often difficult to maintain global synchronization of the network devices when some nodes fail due to the synchronization tree structure of a network listening technique. Any child network device configured with the failed network device as its synchronization target, as well as any further child network devices downstream in the synchronization tree, will be in danger of losing synchronization. Thus, fast and efficient selection of a new synchronization target for the network device is of paramount importance. A number of techniques for selecting a new synchronization target have been utilized. However, these techniques have generally not been well suited for use with respect to some network scenarios and/or configurations. For example, the existing synchronization techniques are overly restrictive, and often ineffective, when operating under certain standard operational constraints.

BRIEF SUMMARY OF THE INVENTION

The present invention is directed to methods and systems which provide for synchronization target selection by configuring a network device to reselect a synchronization signal transmission timeslot for synchronization target searching by the network device (referred to herein as "synchronization signal timeslot reselection"). For example, network devices may operate in a synchronization target hierarchy of a network listening technique for synchronizing the network devices, wherein synchronization signals are transmitted by network devices of the synchronization target hierarchy using a timeslot structure indicating the stratum index of a network device transmitting a synchronization signal. In operation according to embodiments, when a network device loses its current synchronization target the network device may reselect the synchronization signal timeslot for moving or relocating the timeslot for its transmission of a synchronization signal during the search for a new synchronization target.

Synchronization signal timeslot reselection implemented according to embodiments of the invention provides for downgrading a current stratum index to a stratum index that does not accurately indicate a number of hops between the network device and a global synchronization source (referred to herein as an "artificial stratum index"). For example, embodiments of the invention provide for selection of a new synchronization target for a network device when the network device loses its current synchronization target by downgrading the current stratum index of the network device to an artificial stratum index, and reselecting the synchronization signal timeslot to a timeslot corresponding to the artificial stratum index, until selection of a new synchronization target is made. By reselecting the synchronization signal timeslot to be that of a downgraded artificial stratum index, embodiments of the present invention allow for selection of available synchronization targets with stratum indices higher than that of the failed synchronization target as well as synchronization targets with stratum indices that are higher than or equal to the network device's stratum index.

Moreover, operation according to embodiments provides for propagating synchronization signal timeslot reselection to network devices at higher (worse) stratum levels within a synchronization target hierarchy. For example, current stratum indices of downstream children network devices are correspondingly downgraded to artificial stratum indices, and their synchronization signal timeslots relocated to timeslots corresponding their respective artificial stratum index, before a network device's selection of a new synchronization target. Operation in accordance with such embodiments ensures that the network device does not select one of its own downstream children network devices as its synchronization target. It should be appreciated that a network device selecting one of its children network devices, or any downstream network device of such a network device, as a synchronization target would create a synchronization loop in which a parent network device is synchronized to a child network device that is itself synchronized to the parent network device. In a synchronization loop, the network devices are not synchronized to the global synchronization source, but rather to each other in a loop, with no path to the global synchronization source. Thus, embodiments provide for synchronization target selection without resulting in a synchronization loop.

Embodiments of the invention implement a synchronization signal pattern cycle structure having synchronization signal timeslots organized into multiple subcycles for accommodating synchronization signal timeslot reselection. For example, a first subcycle (referred to herein as a "stratum index subcycle") of a synchronization signal pattern cycle may provide a number of synchronization signal timeslots to provide a discrete timeslot for each stratum level or stratum index of a synchronization target hierarchy and a second subcycle (referred to herein as an "artificial stratum index subcycle") of the synchronization signal pattern cycle may provide a number of synchronization signal timeslots to provide a discrete timeslot for each artificial stratum index. The foregoing multiple subcycle synchronization signal pattern cycle structure defines a reference signal (RS) pattern for each stratum level according to embodiments.

In normal operation according to embodiments, when a network device is able to reliably receive a synchronization signal from its current synchronization target, that network device will transmit a synchronization signal only in a timeslot of the stratum index subcycle and will not transmit a synchronization signal in a timeslot of the artificial stratum index subcycle. However, when the network device loses its current synchronization target (e.g., is unable to reliably receive a synchronization signal from its current synchronization target), that network device will implement synchronization signal timeslot reselection to reassign synchronization signal transmission to a timeslot of the artificial stratum index subcycle according to embodiments. The network device operating in accordance with embodiments will transmit its synchronization signal in a timeslot of the artificial stratum index subcycle related to its previous stratum index, and not transmit a synchronization signal in a timeslot of the stratum index subcycle, if the network device does not identify a new synchronization target prior to the time of that respective timeslot of the artificial stratum index subcycle. However, the network device may transmit its synchronization signal in a timeslot of the stratum index subcycle corresponding to a new stratum index, and not transmit a synchronization signal in a timeslot of the artificial stratum index subcycle, if the network device identifies a new synchronization target prior to the time of the timeslot of the artificial stratum index subcycle corresponding to its previous stratum index. The continued transmission of synchronization signals using such a synchronization signal pattern cycle structure not only accommodates artificial stratum indices suitable for avoiding synchronization loops, but facilitates continued synchronization of a plurality of network devices in the synchronization target hierarchy below the network device that has lost its synchronization target (e.g., an isolated island of network devices comprising a branch of network devices under a disconnected network device).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
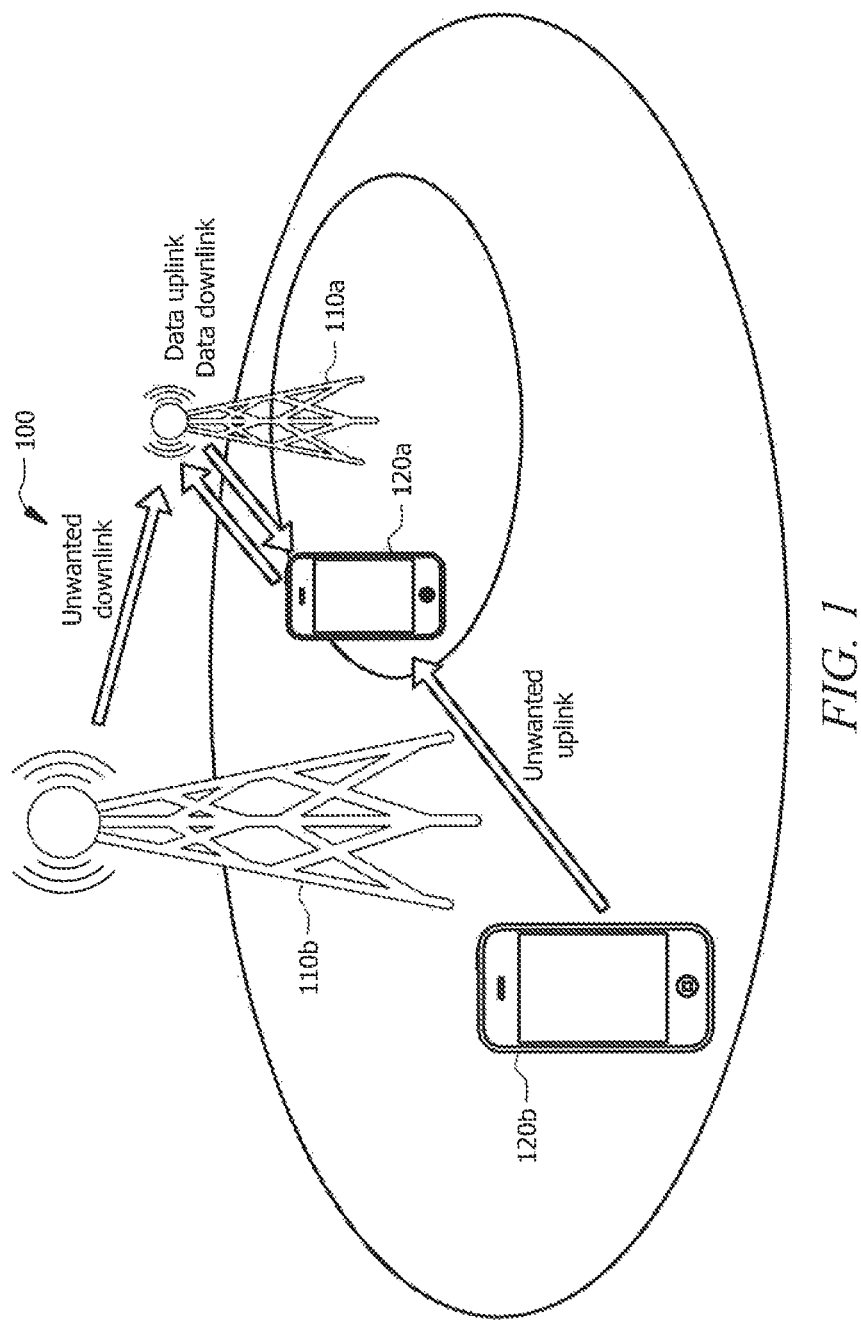
FIG. 1 illustrates a network system configured with wireless communication capabilities.

FIG. 1 shows an implementation of a wireless network in which various network devices may be synchronized to provide alignment of transmissions. In a synchronous communications network, such as wireless network 100 of FIG. 1, network devices may be synchronized to a global synchronization source for aligning their transmissions, such as to avoid or minimize interference caused by transmissions of the network devices within the network. For example, network 100 may operate in TDD mode, wherein transmissions between the various network devices may be time synchronized. In this case, each of base stations 110a (e.g., HeNB) and 110b (e.g., macro eNB) and mobile devices 120a (e.g., smartphone, personal digital assistant (PDA), tablet computing device, laptop computing device, etc.) and 120b (e.g., smartphone, PDA, tablet computing device, laptop computing device, etc.) may be time synchronized. In operation, synchronization signals may be transmitted directly or indirectly to each of base stations 110a and 110b and mobile devices 120a and 120b from a global synchronization source (not shown). The synchronization signals from the global synchronization source may be used by base stations 110a and 110b and mobile devices 120a and 120b to synchronize their respective communications in network 100. Such synchronization signals may not only comprise references signals from which a receiving network node may synchronize its transmission and/or reception operations with the network device transmitting the synchronization signal and/or other nodes of the network. In accordance with some embodiments, a synchronization signal may comprise information such as the extent of time misalignment between the synchronization signal transmission network device and the receiving network device, the identification number (or cell ID) of the transmitting network device, etc. Additionally or alternatively, a synchronization signal of embodiments may be configured to facilitate signal reception quality metrics being determined or known by listening to the synchronization signal.

When a device within the network is not properly synchronized, however, interference with other transmissions may occur due to the transmission misalignment. For example, if base station 110a and mobile device 120a are not properly synchronized to the other devices of network 100, their downlink (DL) and uplink (UL) may be misaligned with the ULs and DLs of base stations 110b and mobile device 120b. In this case, base station 110a, while expecting to receive interference-free UL transmissions from mobile device 120a, may be subjected to interference from transmissions on the misaligned DL of base station 110b. Mobile device 120a, while expecting to receive interference-free DL transmissions from base station 110a, may also be subjected to interference from transmissions on the misaligned UL of mobile station 120b. Similarly, if base station 110b and mobile device 120b are not properly synchronized to the other devices of network 100, their misaligned transmissions may cause interference for base station 110a and mobile device 120a. Thus, it may be critically important to ensure that each of base stations 110a and 110b and mobile devices 120a and 120b of network 100 are properly synchronized.

Figure 2A:
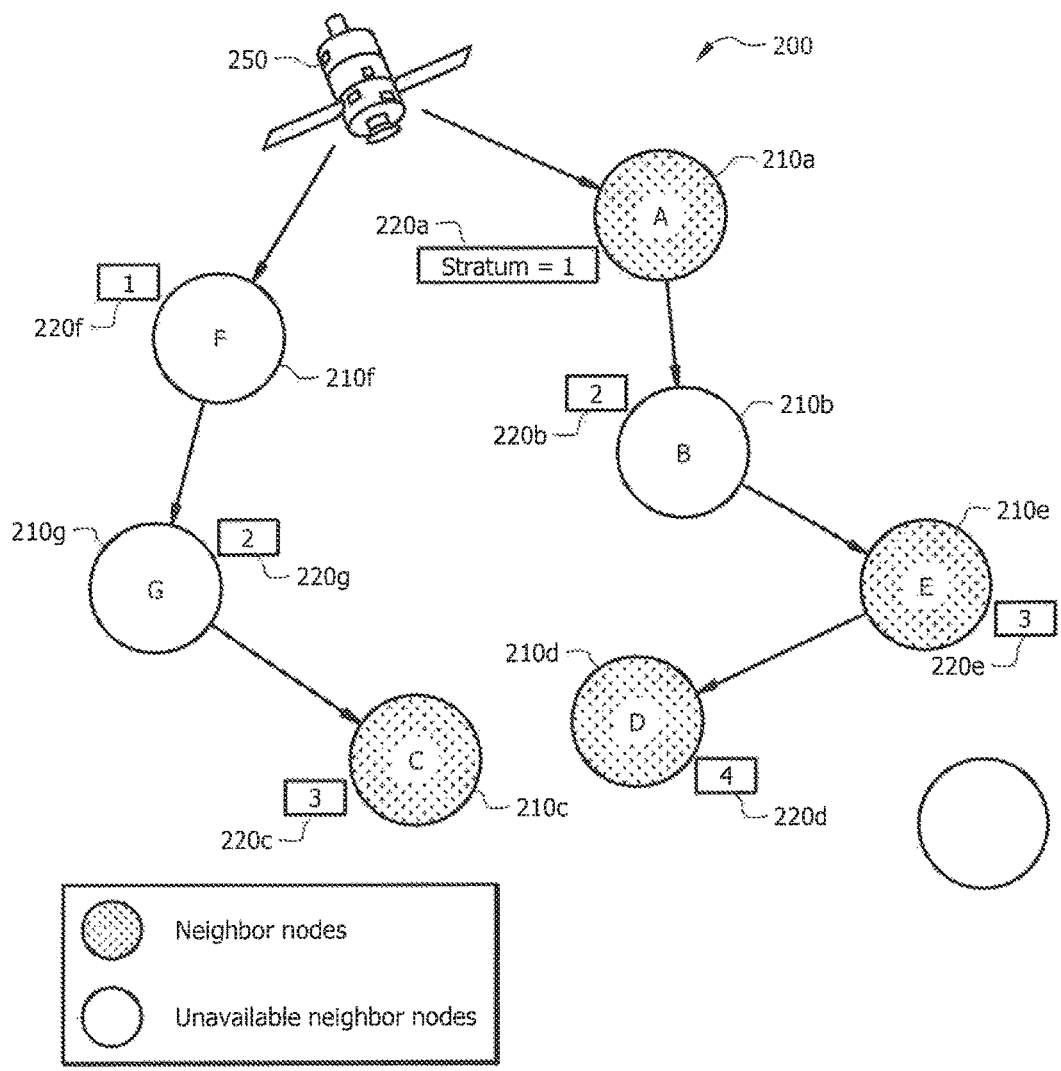
FIG. 2A illustrates a functional diagram of an exemplary system configured with capabilities and functionality for selection of a new synchronization target in a wireless network according to aspects of the present invention.
Figure 2B:
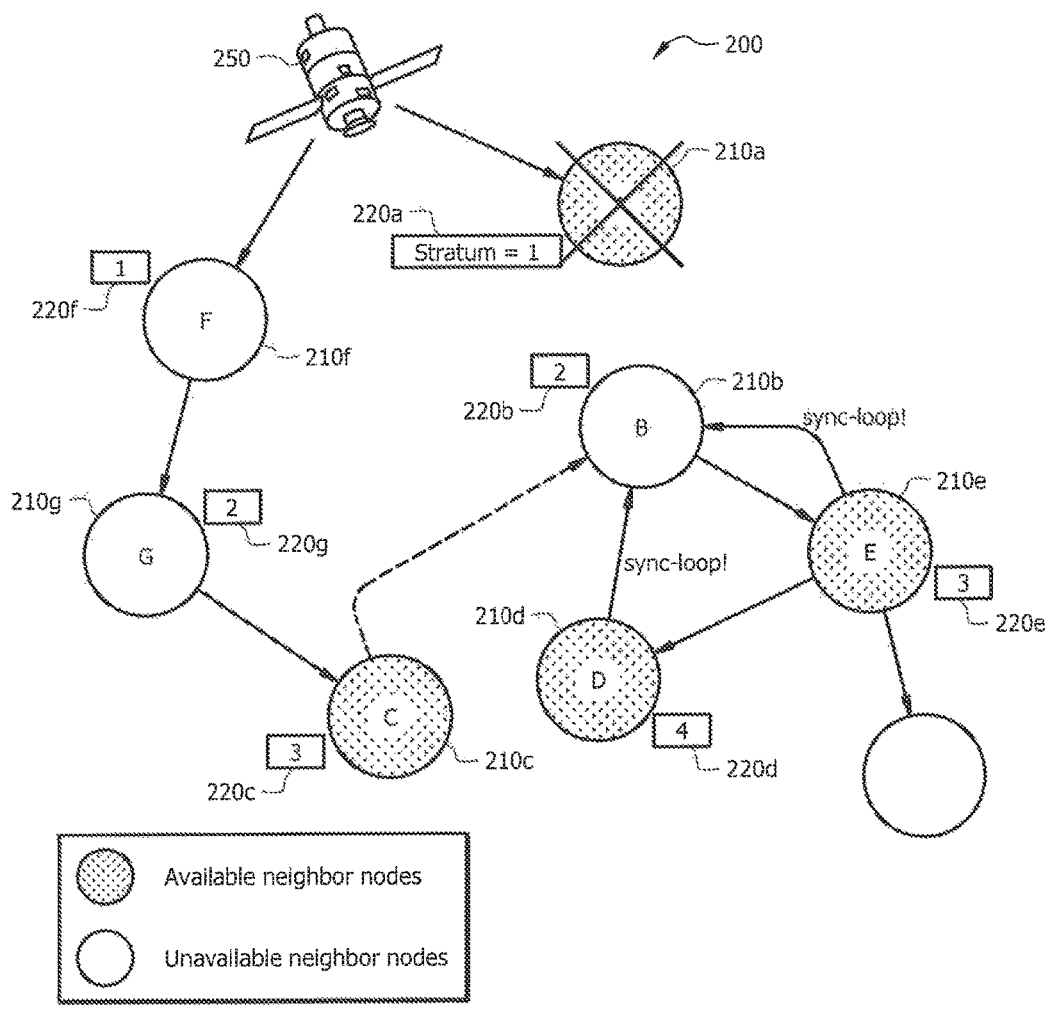
FIG. 2B illustrates another functional diagram of the exemplary system configured with capabilities and functionality according to aspects of the present invention.

FIGS. 2A and 2B show functional diagrams of an exemplary system adapted to provide synchronization signal timeslot reselection for synchronization target selection in accordance with aspects of the present invention. In particular, FIGS. 2A and 2B show wireless network 200, including network devices 210a-g, configured to operate as a synchronous communication network. For example, wireless network 200 may operate in TDD mode.

Each of network devices 210a-g shown in the illustrated embodiment of wireless network 200 may comprise a base station, or portion of a base station. For example, any or all of network devices 210a-g may comprise an eNodeB, a macro cell, a femtocell, a pico cell, or another type of base station (e.g., access point, network "hot spot" device, etc.), or a portion thereof, one or more of which are disposed within communication range of others of network devices 210a-g. Such base stations may, for example, be deployed for facilitating wireless communications for various user equipment, terminal devices, etc., such as mobile devices 120a and 120b of FIG. 1. Additionally or alternatively, any or all of network devices 210a-g may comprise a mobile device, such as a Smartphone, a PDA, a tablet computing device, a laptop computing device, or another type of wireless communication device. Irrespective of their particular embodiment, network devices 210a-g may be configured to communicate with one or more wireless entities and/or networks, and with other network devices, according to one or more protocols (e.g., a 3rd Generation (3G) protocol, a 4G)/LTE protocol, an 802.11 protocol, an 802.16 protocol, etc.). Wireless network 200 may be a cellular communication network, a cellular data network, a wireless local area network (WLAN), etc.

In the illustration of FIG. 2A, network devices 210a-g have been synchronized and are operating to provide transmissions that are aligned in time. However, wireless network 200 may be operating within some standard operational constraints that affect the ability to obtain synchronization signals by one or more of network devices 210a-g. For example, wireless network 200, or some portion thereof, may not be configured with backhaul links (e.g., one or more base stations may operate without benefit of wired backhaul links to network infrastructure, such as may provide certain configuration and operational data, network traffic, etc.). Additionally or alternatively, at least some portion of wireless network 200 may be configured with backhaul links, although backhaul signaling for synchronization may not be possible because, for example, an operator may restrict private communication amongst network devices 210a-g over the backhaul links. Therefore, in either case, synchronization of some or all of network devices 210a-g may be accomplished without employing backhaul signaling, such as by using network listening techniques for relaying or otherwise coordinating synchronization signals provided by a global synchronization source (e.g., global synchronization source 250) through the network.

Global synchronization source 250 may be a device, system, or network entity that is configured to operate as a common synchronization source to which network devices in wireless network 200 are synchronized. In various aspects, global synchronization source 250 may be a single device or entity, may be a system or part of a system, or may be distributed over several entities. For example, global synchronization source 250 may comprise one or more synchronization servers, one or more GPS satellites, etc. In various aspects, global synchronization source 250 may comprise a macro base station. For example, various low-power small cells may be deployed within the coverage of a high-power macro base station. In this case, the high-power macro base station may serve as a global synchronization source for the low-power small cells. It is noted that, although FIG. 2A shows synchronization source 250 as part of wireless network 200, synchronization source 250 may not be part of wireless system 200, and may be a global synchronization source external to wireless network 200. For example, wireless network 200 may comprise a cellular network or other wireless network and global synchronization source 250 may comprise apparatus of a system external thereto (e.g., GPS).

Global synchronization source 250 may provide synchronization signals that are transmitted to the network devices, which the network device may use in establishing synchronous operation with other network devices of the network. However, the synchronization signals provided by global synchronization source 250 may not be reliably received by all network devices using such synchronization signals to establish desired synchronization. For example, GPS receivers are typically restricted to outdoor deployments or other deployments having a relatively clear view of the sky, as their performance indoors and otherwise obstructed areas is extremely limited. Thus, a network device adapted for using GPS synchronization may not be able to reliably receive synchronization signals when deployed in some situations.

In the exemplary example illustrated in FIG. 2A, global synchronization source 250 may transmit synchronization signals within wireless network 200, wherein network devices 210a and 210f may be disposed (e.g., deployed outdoors or deployed indoors near an exterior perimeter) to reliably receive the synchronization signals from global synchronization source 250 and use the synchronization signals for synchronization. However, network devices 210b-e and 210g illustrated in FIG. 2A may not be disposed (e.g., deployed indoors in an interior space or deployed in an area heavily shadowed by terrain or buildings) to reliably receive the synchronization signals from global synchronization source 250. In this case, network devices 210b-e and 210g may be configured to synchronize using synchronization signals transmitted by a synchronization target rather than directly using synchronization signals transmitted by global synchronization source 250. For example, in the embodiment illustrated in FIG. 2A, network device 210b is within communications range of network device 210a, which is synchronized directly to global synchronization source 250. As such, network device 210b may receive a synchronization signal transmitted by network device 210a and thus is configured with network device 210a as its synchronization target in the illustrated embodiment. Similarly, in the illustrated embodiment, network device 210e is within communications range of network device 210b, which is synchronized to global synchronization source 250 using a synchronization signal transmitted by network device 210a. As such, network device 210e may receive a synchronization signal transmitted by network device 210b and is configured with network device 210b as its synchronization target in the illustrated example. Likewise, network devices 210c, 210d, and 210g, which may not be able to receive the synchronization signals directly from global synchronization source 250, are synchronized by being configured with a synchronization target network device that is within range of these network devices in the illustrated embodiment. For example, in the example illustrated in FIG. 2A, network device 210d is configured with network device 210e as its synchronization target, network device 210g is configured with network device 210f as its synchronization target, and network device 210c is configured with network device 210g as its synchronization target.

As can be appreciated from the foregoing, synchronization signals from global synchronization source 250 may relayed to a network device by its synchronization target network device. In this way, network devices 210b-e and 210g may be provided the synchronization signals from, or derived from, global synchronization source 250 and may be able to use the synchronization signals to synchronize their operations with other network devices in the network. It should be appreciated that in the foregoing synchronization signal relay operation, a child network device (e.g., network devices 210b-e and 210g) may not be provided the synchronization signals from global synchronization source 250 by its synchronization target, but instead may be provided with synchronization signals generated by a synchronization target suitable for establishing synchronous operation in the network. In either case, as the synchronization target has synchronized operations with other network devices in the network (e.g., using synchronization signals directly provided from global synchronization source 250 or derived therefrom), the child network device may also synchronize its own operations with other network devices in the network by synchronizing to a synchronization target network device. Accordingly, network devices 210b-e and 210g, while unable to receive synchronization signals directly from global synchronization source 250, are nonetheless able to properly synchronize operation with respect to the other network devices of wireless network 200. It is noted that synchronizing to a synchronization target network device may refer to synchronizing directly to the synchronization target network device, or may refer to the situation where a network device synchronizes to the global synchronization source using synchronization signals relayed by the synchronization target network device.

As illustrated in FIG. 2A, configuring network devices 210a-g of wireless network 200 for synchronization by relaying or otherwise coordinating synchronization signals provided by a global synchronization source through the network in accordance with the concepts herein, may create a synchronization tree with parent network devices and children network devices. For example, in the embodiment illustrated in FIG. 2A, network device 210b is configured with network device 210*a* as its synchronization target. Thus, network device 210*b* is a child network device of parent network device 210*a*. Network device 210*e* is configured with network device 210*b* as its synchronization target and network device 210*d* is configured with network device 210*e* as its synchronization target in the illustrated embodiment. Thus, network device 210*e* is a child network device of parent network device 210*b*, and child network device 210*d* is a child network device of parent network device 210*e*. It is noted that a network device may be both a parent to one network device and child of another network device. The parent-child network device relationship of the network devices creates a synchronization target hierarchy of the synchronization tree mentioned above. In this example, the synchronization tree may include a path from network device 210*d* to global synchronization source 250, defined from network device 210*d* to its parent network device 210*e*, then from network device 210*e* to its parent network device 210*b*, then from network device 210*b* to its parent network device 210*a*, and then from network device 210*a* to global synchronization source 250.

In the aforementioned synchronization target hierarchy, each network device in wireless network 200 may have a stratum index. The stratum index of a particular network device may indicate the distance (e.g., in hops) that exist between the particular network device and the global synchronization source, following the synchronization tree (the stratum indices of the exemplary embodiment illustrated in FIG. 2A being indicated by reference numerals 220*a*-220*g*). For example, network device 210*b* of the illustrated embodiment is configured with network device 210*a* as its synchronization target, and network device 210*a* is provided its synchronization signal directly from global synchronization source 250. As such, there is a distance of two hops between network device 210*b* and global synchronization source 250. It will be appreciated that the two hops of this example include one hop from network device 210*b* to network device 210*a*, and then another hop from network device 210*a* to global synchronization source 250. In this case, network device 210*b* is said to have a stratum index of 2 and thus is of stratum level 2. In another example, network device 210*e* of the embodiment illustrated in FIG. 2A has a stratum index of 3, and is thus of stratum level 3, as there are three hops between network device 210*e* and global synchronization source 250 (e.g., one hop from network device 210*e* to network device 210*b*, one hop from network device 210*b* to network device 210*a*, and one hop from network device 210*a* to global synchronization source 250).

Embodiments of the present invention implement a synchronization signal cycle pattern configured to indicate the stratum level of a network device transmitting a synchronization signal, whereby the stratum index of a network device may be indicated to other network devices in the network. For example, a synchronization signal cycle pattern of embodiments may provide a plurality of synchronization signal timeslots, such as may be interleaved with respect to data timeslots, wherein the synchronization signal transmitted by a network device of a particular stratum level is transmitted in a timeslot of the synchronization signal cycle pattern associated with, assigned to, or otherwise corresponding to the particular stratum level. Accordingly, any network device receiving such a synchronization signal is enabled to identify the stratum level of the network device transmitting the synchronization signal from the location of the timeslot within the synchronization signal cycle pattern. Where the network device receiving the synchronization signal selects the network device transmitting the synchronization signal as its synchronization target (i.e., parent network device), the network device receiving the synchronization signal (i.e., child network device) will be of a different stratum level (e.g., one stratum level greater than that of the parent network device) and thus transmit its own synchronization signal using a different synchronization signal timeslot of the synchronization signal cycle pattern. Thus, the child network device is free to receive a parent network device's synchronization signal and transmit a synchronization signal for use by downstream child network devices without synchronization signal timeslot contention within the synchronization signal cycle pattern of embodiments.

Figure 3:
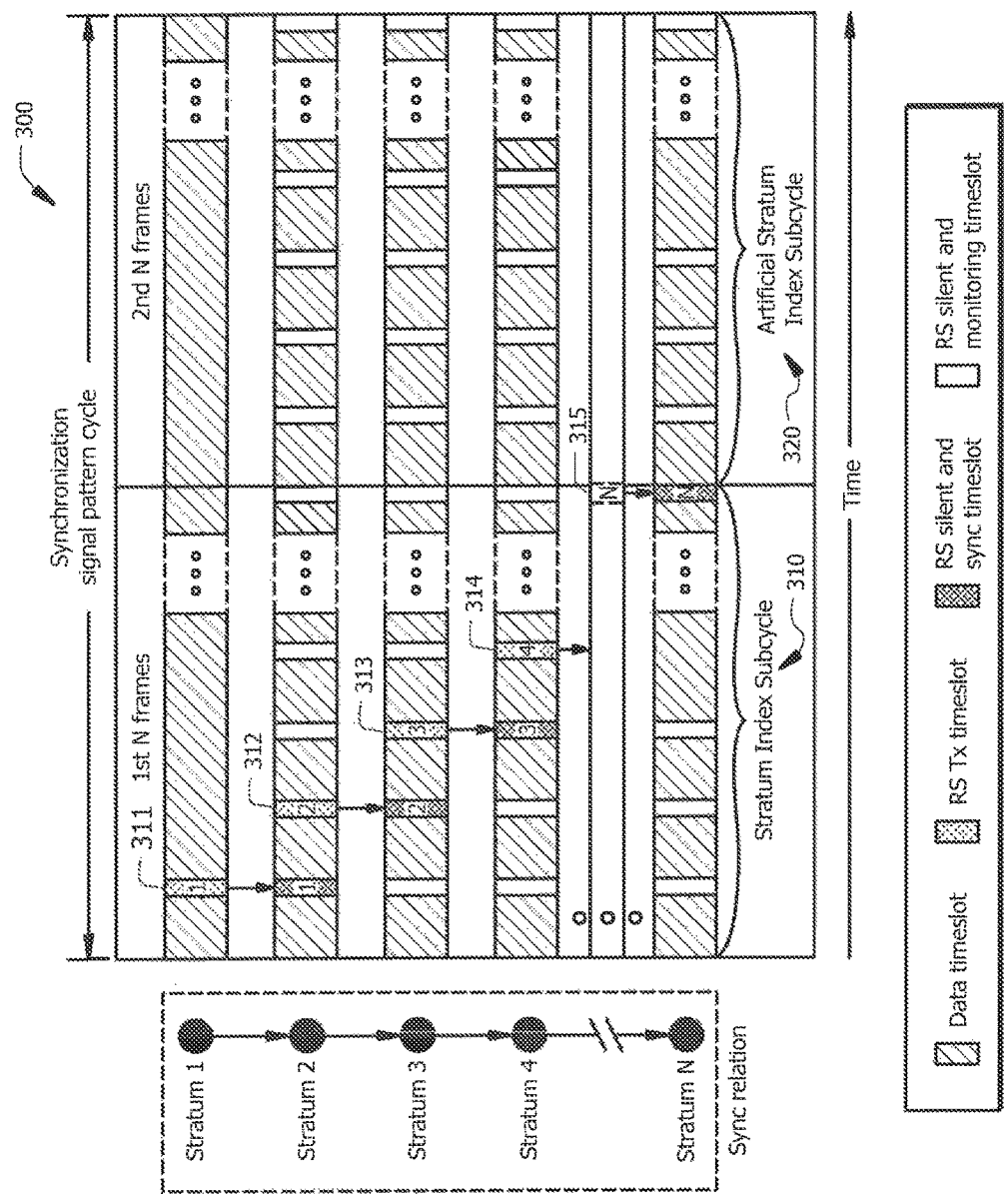
FIG. 3 illustrates a synchronization signal cycle pattern in accordance with embodiments of the present invention.

An exemplary embodiment of a synchronization signal cycle pattern in accordance with the foregoing, as may be utilized according to embodiments of the invention, is shown in FIG. 3. In particular, synchronization signal cycle pattern 300 of FIG. 3 provides a synchronization signal timeslot pattern configuration within stratum index subcycle 310 having a number of synchronization signal timeslots to provide a discrete timeslot for each stratum level or stratum index of a synchronization target hierarchy (e.g., discrete timeslots for each stratum level of an actual or maximum depth of the synchronization tree). The synchronization signal timeslot pattern configuration of embodiments of stratum index subcycle 310 organizes timeslots for each stratum of a higher (worse) level to be later in time than timeslots for each stratum of a lower (better) level. That is, in the illustrated embodiment of stratum index subcycle 310, synchronization signal timeslot 311 (corresponding to stratum level 1) is provided earlier in time in an instance of synchronization signal pattern cycle 300 than are synchronization signal timeslots 312 (corresponding to stratum level 2), 313 (corresponding to stratum level 3), 314 (corresponding to stratum level 4), and 315 (corresponding to stratum level N, wherein N may be greater than or equal to an actual or maximum tree depth of wireless network 200). Likewise, synchronization signal timeslot 312 (corresponding to stratum level 2), although provided later in time in an instance of synchronization signal pattern cycle 300 than is synchronization signal timeslot 311 (corresponding to stratum level 1), is provided earlier in time in the instance of synchronization signal pattern cycle 300 than are synchronization signal timeslots 313 (corresponding to stratum level 3), 314 (corresponding to stratum level 4), and 315 (corresponding to stratum level N), and so on.

It should be pointed out that a tree depth of a wireless network may be determined by the largest stratum index of any of the network devices within the wireless network. Put differently, the tree depth of a wireless network may be indicated by the greatest distance (e.g., number of hops) between any network device and the global synchronization source of the network. For example, system 200 may include a number of network devices at different stratum levels. The largest stratum index in network 200 of the exemplary embodiment illustrated in FIG. 2A may belong to network device 210*d*, having a stratum index of 4. In this example, the stratum index may indicate the number of hops between the network device and the global synchronization source. Therefore, there may be four hops between network device 210*d* and global synchronization source 250. In this case, the tree depth of wireless network 200 may be determined to be 4. It should be appreciated that a maximum tree depth for a network may be established (e.g., by a maximum distance (e.g., number of hops) through which desired accuracy in synchronization with a global synchronization source may be maintained), and a tree depth of a network may not exceed the maximum tree depth. The maximum tree depth may be predetermined, or may be dynamically determined based on operational conditions and requirements.

During operation in accordance with embodiments herein, network device 210a, having a communication link with global synchronization source 250, may be configured with global synchronization source 250 as its synchronization target. Network device 210a may thus be synchronized based on wireless signals received via the communication link with global synchronization source 250 and thus be of stratum level 1 and use synchronization signal timeslot 311 of stratum index subcycle 310 for transmission of its synchronization signal to downstream network devices. Network device 210b, having a communication link with network device 210a but not with global synchronization source 250, may be configured with global network device 210a as its current synchronization target. Network device 210b may thus be synchronized based on wireless signals received via the communication link with network device 210a and thus be of stratum level 2 and use synchronization signal timeslot 312 of stratum index subcycle 310 for transmission of its synchronization signal to downstream network devices. Other network devices, such as network devices 210c-g, may be similarly synchronized to their respective synchronization targets, using respective synchronization signal timeslots of stratum index subcycle 310 for transmission of their synchronization signals to downstream network devices (it being appreciated that a network device of stratum level N corresponding to the wireless tree depth may forego synchronization signal transmission due to there being no downstream network devices in the synchronization target hierarchy). Accordingly, since stratum level is indicated to the downstream network devices, each network device can declare its stratum level as one greater than that of its parent, connected network device.

At some point during operation of a network, such as wireless network 200, the communication link used for transmission of synchronization signals between various network devices thereof may fail. For example, as shown in the example of FIG. 2B, the communication link between network devices 210a and 210b may fail (e.g., network device 210a may become inoperable) or network device 210a may otherwise fail to provide a proper synchronization target for network device 210b (e.g., network device 210a is unable to maintain a reliable communication link with global synchronization source 250). Such a failure of the communication link between network devices 210a and 210b may be due to a degradation in the transmission signals over the link (e.g., the channel between network device 210a and network device 210b may become heavily interfered), a malfunction of network device 210a, etc. Irrespective of the root cause, network device 210b may not be able to reliably receive synchronization signals from network device 210a to synchronize operations with other network devices of the network, and thus, network device 210b may determine to select a new synchronization target. For example, when network device 210a fails, network device 210b of embodiments operates to reselect a neighboring network device as a synchronization target in order to obtain synchronization via a different route.

As shown in FIG. 2B, network device 210b may have several neighbor network devices, one or more of which may be within wireless communication range of network device 210b. One or more of network device 210b's neighbor network devices may be unavailable to serve as synchronization targets for network device 210b (e.g., disposed beyond communication range of network device 210b, providing a received signal strength at network device 210b insufficient to support reliable communication, etc.). However, one or more of network device 210b's neighbor network devices may be available to serve as synchronization targets (e.g., disposed within communication range of network device 210b, providing a received signal strength at network device 210b sufficient to support reliable communication, etc.), although any or all such neighbor network devices available to server as synchronization targets may or may not be suitable to serve as a synchronization target for network device 210b (as discussed further below).

In some embodiments, whether a neighbor network device is available or unavailable to serve as a synchronization target of another network device may be determined based on signal measurements of the neighbor network devices. For example, signal strength and/or signal quality measurements of the signals from network device 210c received at network device 210b may be used to determine whether network device 210c is available or unavailable to serve as a synchronization target of network device 210b. Such strength and/or quality measurements may include, without limitation, Received Signal Strength Indicator (RSSI), Reference Signal Received Power (RSRP), Reference Signal Receive Quality, (RSRQ), Signal to Interference-plus-Noise Ratio (SINR), Energy to Interference Ratio (ECIO), etc. In some cases, the signal measurements may indicate whether a network device is within range of the other network device. Based on the received signal strength and/or signal quality measurements, a network device may be determined to be available or unavailable to serve as a synchronization target. For example, a network device may be determined to be available to serve as a synchronization target when the signal strength and/or signal quality measurements of signals received from the network device exceed a predetermined threshold. In accordance with the foregoing example, when the signal strength and/or signal quality measurements of signals received from a network device do not exceed a predetermined threshold, the network device may be determined to be unavailable to serve as a synchronization target.

Continuing with the example illustrated in FIG. 2B, network devices 210c, 210d, and 210e, may be determined to be available to serve as a synchronization target of network device 210b. Network devices 210f and 220g may be determined to be unavailable to serve as a synchronization target of network device 210b. In this example, wherein network devices 210c, 210d, and 210e are available neighboring network devices, if network device 210b were to select either of network devices 210d or 210e as its synchronization target a synchronization loop would result in light of network devices 210d and 210e obtaining synchronization signals from network device 210b.

Embodiments of the present invention facilitate searching for a suitable synchronization target (e.g., an available network device which if utilized as a synchronization target will not result in a synchronization loop being formed) by operating to reselect the synchronization signal timeslot of a network device which has lost communication with its current synchronization target. For example, synchronization signal timeslot reselection is implemented according to embodiments of the invention, wherein a current stratum index for the network device which has lost communication with its current synchronization target is downgraded to an artificial stratum index that does not accurately indicate a number of hops between the network device and a global synchronization source. Operation according to embodiments provides for the stratum index of a network device that has lost communication with its current synchronization target to be downgraded to an artificial stratum index by increasing the current stratum index of the network device by a value D. That is, the current stratum index of a network device that has lost communication with its synchronization target is downgraded by increasing the current stratum index by D. The downgrade value, D, utilized according to embodiments may be any integer sufficiently large to facilitate avoidance of a synchronization loop (e.g., selection of a child network device of the network device that has lost communication with its synchronization target) when selecting a new synchronization target in accordance with the concepts herein. For example, embodiments of the present invention select the downgrade value, D, to be greater than or equal to an actual or maximum tree depth (e.g., D≥N).

Referring again to FIG. 3, synchronization signal cycle pattern 300 of FIG. 3 includes artificial stratum index subcycle 320, in addition to stratum index subcycle 310 discussed above. Artificial stratum index subcycle 320 of embodiments has a number of synchronization signal timeslots to provide a discrete timeslot for each artificial stratum index available for use in synchronization signal timeslot reselection, wherein the artificial stratum indices comprise an artificial stratum index related to each stratum index of the stratum indices of the stratum index subcycle. Artificial stratum index subcycle 320 of embodiments provides synchronization signal timeslots corresponding to the above described downgraded stratum indices. For example, in accordance with some embodiments, artificial stratum index subcycle 320 provides a synchronization signal timeslot pattern configuration accommodating a plurality of artificial stratum indices (e.g., artificial stratum indices providing a one-to-one relation to the stratum indices). Embodiments provide a synchronization signal timeslot pattern configuration within artificial stratum index subcycle 320 in which timeslots for each artificial stratum of a higher (worse) level is provided later in time than timeslots for each artificial stratum of a lower (better) level, similar to the synchronization signal timeslot pattern configuration of stratum index subcycle 310 described above. Accordingly, where a stratum index is downgraded by value D a corresponding timeslot position within artificial stratum index subcycle 320 is identified.

Figure 4A:
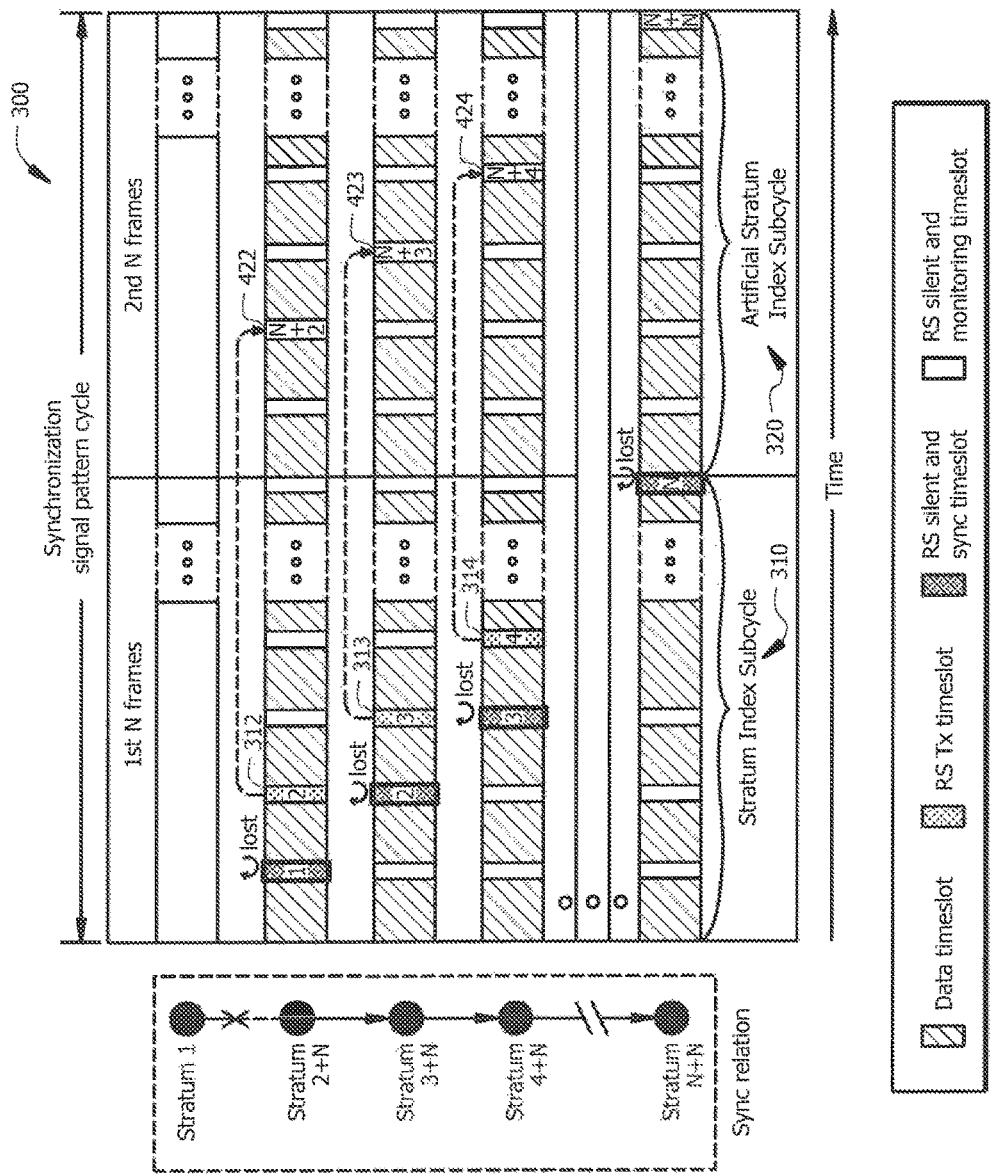
FIGS. 4A-4C illustrate reselection of synchronization signal time slots within a synchronization signal cycle pattern 300 in accordance with embodiments of the invention.
Figure 4B:
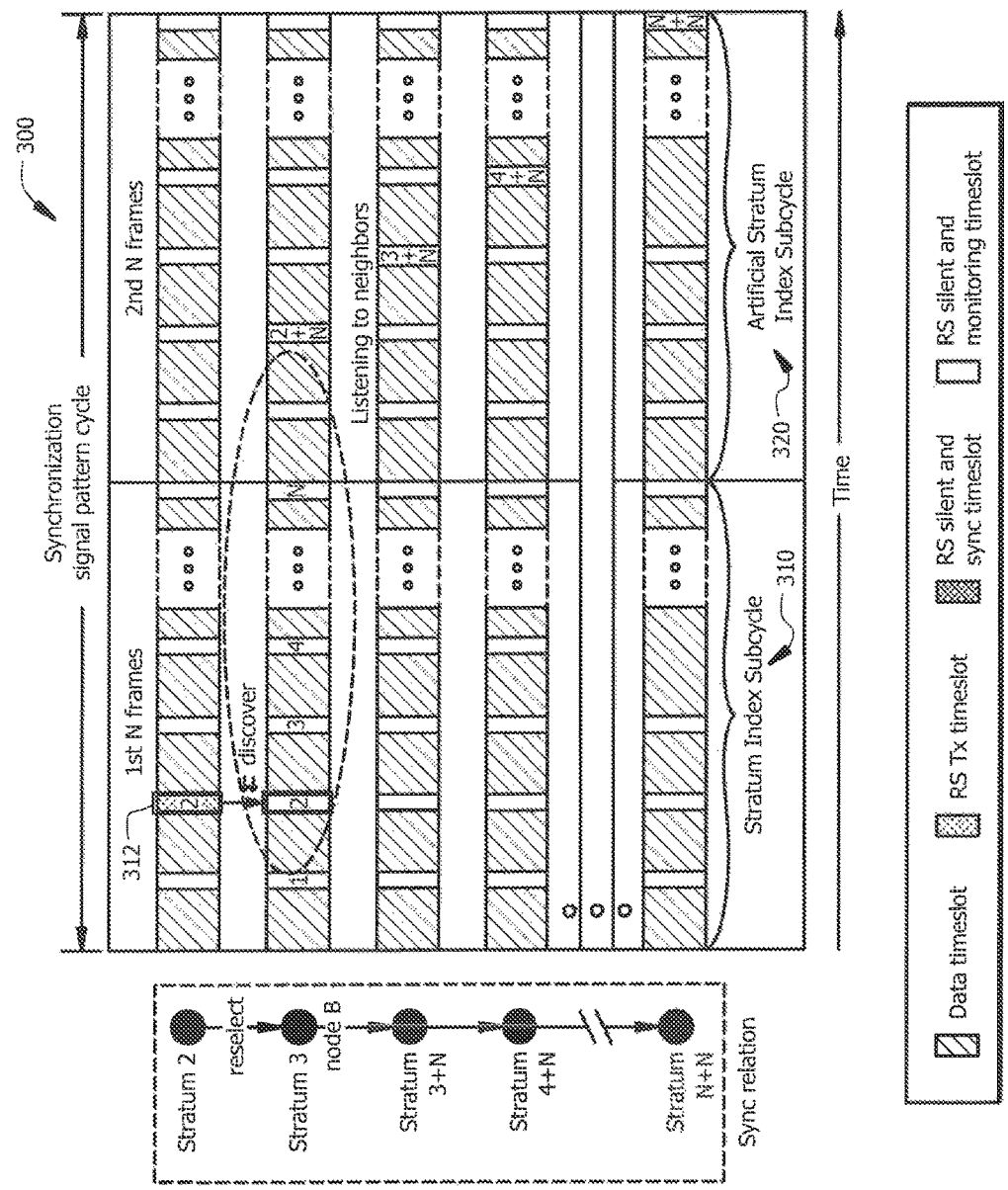
Figure 4C:
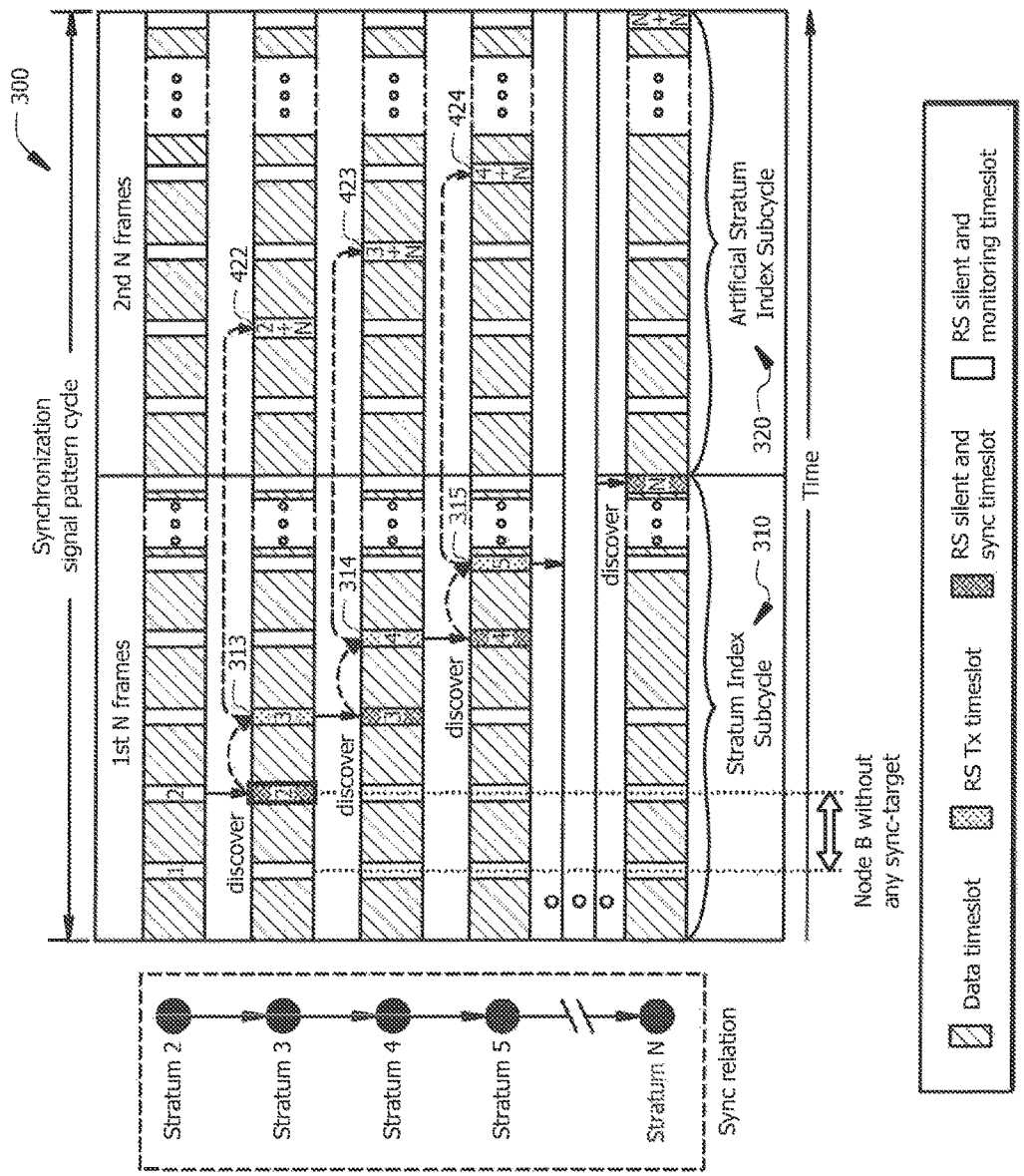
Figure 5A:
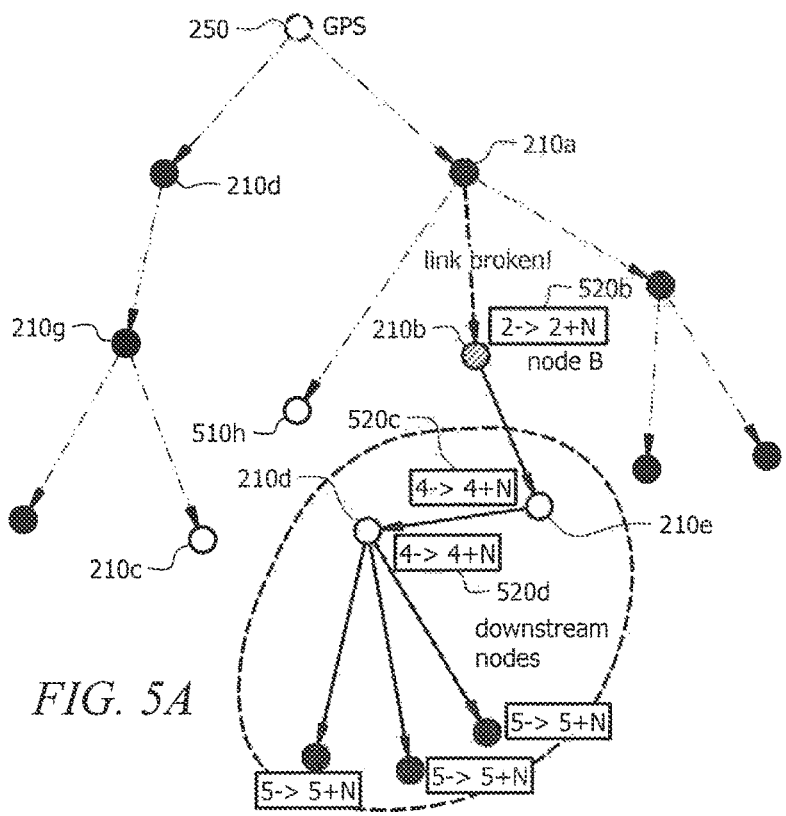
FIGS. 5A-5C show functional diagrams, corresponding to synchronization signal time slot reselections of a respective one of FIGS. 4A-4C, illustrating application of stratum index reselection to network devices of a wireless network in accordance with embodiments of the invention.
Figure 5B:
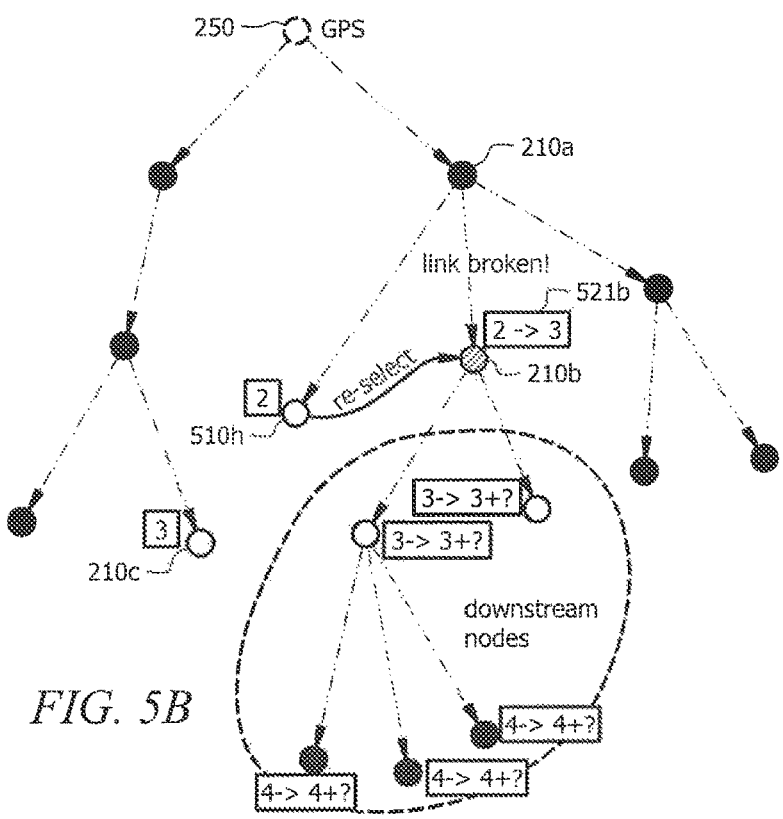
Figure 5C:
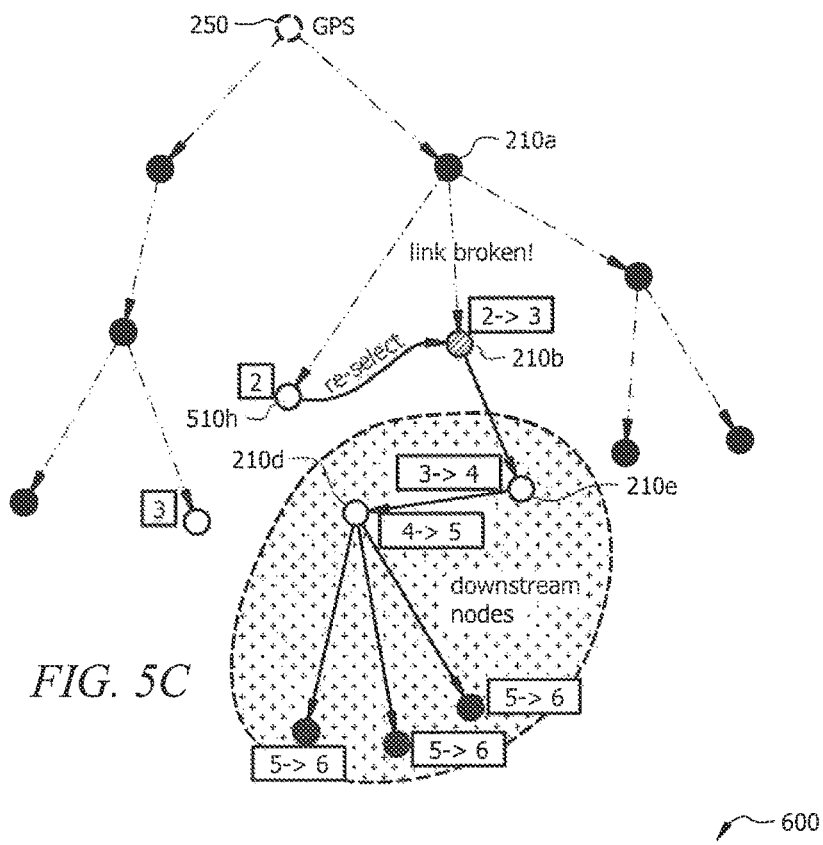

FIGS. 4A-4C and 5A-5C illustrate implementation of synchronization signal timeslot reselection with respect to a network device losing its current synchronization target and searching for a new synchronization target. In particular, FIGS. 4A-4C illustrate the reselection of synchronization signal time slots within synchronization signal cycle pattern 300 in accordance with embodiments of the invention. FIGS. 5A-5C show functional diagrams, corresponding to synchronization signal time slot reselections of a respective one of FIGS. 4A-4C, illustrating application of stratum index reselection to network devices of wireless network 200.

Reselection of a synchronization signal timeslot to be that of an artificial synchronization signal timeslot by downgrading the current stratum index of the network device to an artificial stratum index to facilitate selection of a new synchronization target when a network device loses its current synchronization target is illustrated in FIGS. 4A and 5A. As shown in the example of FIGS. 4A and 5A, when the link between parent network device 210a and child network device 210b is broken, network device 210b loses the synchronization signal transmitted by network device 210a in synchronization signal timeslot 311 (FIG. 3). In this situation, network device 210b stops scheduled transmission of its synchronization signal in synchronization signal timeslot 312 and logic of network device 210b operates to reselect synchronization signal timeslot 422 (FIG. 4A) for transmission of its synchronization signal instead of synchronization signal timeslot 312 as used in a prior instance of synchronization signal pattern cycle 300. Synchronization signal timeslot 422 of the illustrated embodiment corresponds to an artificial stratum index related to the stratum index at which the network device was previously operating (i.e., prior to loss of communication with parent network device 210a). In particular, synchronization signal timeslot 422 corresponds to artificial stratum index related by a downgrade value, D, to the previous stratum index, wherein in the illustrated embodiment D=N (e.g., an actual or maximum tree depth for the synchronization target hierarchy). Accordingly, network device 210b of the exemplary embodiment is downgraded from stratum level 2 to stratum level 2+N as represented by the stratum index indicated by reference number 520b in FIG. 5A.

Operation according to embodiments provides for propagating synchronization signal timeslot reselection to network devices downstream from network device 210b having lost connection with its synchronization target. Current stratum indices of downstream children network devices are correspondingly downgraded to artificial stratum indices and their synchronization signal timeslots relocated to timeslots corresponding their respective artificial stratum index according to embodiments of the invention. For example, because network device 210b stops scheduled transmission of its synchronization signal in synchronization signal timeslot 312, downstream network devices (e.g., network devices 210d and 210e) connected to the global synchronization source under network device 210b will detect a loss of connection signal from network device 210b and similarly reselect a synchronization signal timeslot. In accordance with embodiments, network device 210e loses the synchronization signal transmitted by network device 210b in synchronization signal timeslot 312, stops scheduled transmission of its synchronization signal in synchronization signal timeslot 313, and logic of network device 210e operates to reselect synchronization signal timeslot 423 (FIG. 4A) for transmission of its synchronization signal instead of synchronization signal timeslot 313 as used in a prior instance of synchronization signal pattern cycle 300. Accordingly, network device 210e of the exemplary embodiment is downgraded from stratum level 3 to stratum level 3+N as represented by the stratum index indicated by reference number 520e in FIG. 5A. Similarly, network device 210d loses the synchronization signal transmitted by network device 210e in synchronization signal timeslot 313, stops scheduled transmission of its synchronization signal in synchronization signal timeslot 314, and logic of network device 210d operates to reselect synchronization signal timeslot 424 (FIG. 4A) for transmission of its synchronization signal instead of synchronization signal timeslot 314 as used in a prior instance of synchronization signal pattern cycle 300. Accordingly, network device 210d of the exemplary embodiment is downgraded from stratum level 4 to stratum level 4+N as represented by the stratum index indicated by reference number 520d in FIG. 5A.

From the forgoing it can be appreciated that, in normal operation according to embodiments, when network device 210b is able to reliably receive a synchronization signal from its current synchronization target (e.g., parent network device 210a), network device 210b will transmit a synchronization signal only in a timeslot of stratum index subcycle 310 and will not transmit a synchronization signal in a timeslot of artificial stratum index subcycle 320. However, when network device 210b loses its current synchronization target (e.g., is unable to reliably receive a synchronization signal from parent network device 210a), network device 210b will implement synchronization signal timeslot reselection to reassign synchronization signal transmission to a timeslot of artificial stratum index subcycle 320 according to embodiments. Accordingly, network device 210b operating in accordance with embodiments may transmit its synchronization signal in synchronization signal timeslot 422 (e.g., the synchronization signal timeslot of artificial stratum index subcycle 320 corresponding to its previous stratum index) of artificial stratum index subcycle 320, and not transmit a synchronization signal in synchronization signal timeslot 312 of stratum index subcycle 310, if network device 210b does not identify a new synchronization target prior to the time of synchronization signal timeslot 422.

In operation according to embodiments, in addition to reselecting a synchronization timeslot for transmission of the network device's synchronization signal in accordance with the foregoing, network device 210b having lost communication with parent network device 210a commences searching for a new synchronization target. It should be appreciated that in synchronization signal pattern cycle 300 of the exemplary embodiment, only synchronization signals of network devices connected to the global synchronization source are transmitted in stratum index subcycle 310, whereas only synchronization signals of network devices for which connection to the global synchronization source has been lost are transmitted in artificial stratum index subcycle 320. Accordingly, having failed to detect the synchronization signal of network device 210a transmitted in synchronization signal timeslot 311, network device 210b of embodiments operates to monitor each subsequent timeslot of stratum index subcycle 310 and timeslots of stratum index subcycle 320 up to but not including timeslots that may be reassigned to the network device and its child devices (e.g., monitor timeslot 312 and all its subsequence timeslots up to but not including 422, including synchronization signal timeslot 312 for which network device 210b is free to monitor because reselection of its synchronization signal timeslot has scheduled synchronization signal transmission within artificial stratum index subcycle 320) to determine a new synchronization target, as illustrated in FIGS. 4B and 5B. Such operation may continue, for example, until no new synchronization signal is discovered at all synchronization signal timeslots of stratum index subcycle 310. Correspondingly, each downstream network device of embodiments similarly having lost the synchronization signal of their parent network device operates to monitor timeslots of stratum index subcycle 310 to determine a new synchronization target and timeslots of stratum index subcycle 320 up to but not including timeslots that may be reassigned to the respective network device and its child devices.

Upon selection of a new synchronization target, operation according to a synchronization signal timeslot reselection technique of embodiments provides for upgrading the stratum index of the network device to be that of an appropriate synchronization signal timeslot (e.g., as opposed to an artificial synchronization signal timeslot) related to the stratum index of the newly selected synchronization target. In the example of FIGS. 4B and 5B, network device 210b detects a synchronization signal transmitted in synchronization signal timeslot 312 of stratum index subcycle 310, and thus discovers a new synchronization target of stratum level 2 (in this example, the same stratum level network device 210b was formerly of). For example, network device 510h may comprise a neighboring network device of stratum level 2 which is available to network device 210b as a synchronization target. Because the stratum index of network device 210b was previously downgraded through operation of the exemplary embodiment, any network device (e.g., network device 510h) having its synchronization signal detected by network device 210b at timeslot 312 or any subsequent timeslots up to but not including timeslots that may be reassigned to the network device and its child devices (e.g., timeslot 422 and subsequent timeslots of stratum index subcycle 320) cannot be a child network device with respect to network device 210b. That is, prior to network device 210b monitoring a synchronization signal at timeslot 312 and all of its subsequent timeslots up to but not including timeslot 422, synchronization signal timeslot reselection operation according to embodiments herein will result in the respective downstream network devices stopping scheduled transmission of its synchronization signal in a synchronization signal timeslot ranging from timeslot 312 (inclusive) to timeslot 422 (exclusive), and reselecting a related synchronization signal timeslot ranging from timeslot 422 (inclusive) to the end of artificial stratum index subcycle 320 for transmission of its synchronization signal. Accordingly, by reselecting the synchronization signal timeslot to that of the downgraded artificial stratum index in accordance with the foregoing, embodiments of the present invention ensure that the network device does not select one of its own downstream children network devices as its synchronization target and thus avoids creation of a synchronization loop. Further, it should be appreciated from the example of FIGS. 4B and 5B that synchronization signal timeslot reselection implemented in accordance with embodiments herein allows for selection of available synchronization targets with stratum indices higher (worse) than that of the failed synchronization target as well as synchronization targets with stratum indices that are higher than or equal to the network device's stratum index.

Upon selecting a new synchronization target, network devices of embodiments of the invention operate to reselect a synchronization signal timeslot of stratum index subcycle 310 corresponding to the new stratum level of the network device. For example, having detected a synchronization signal in synchronization signal timeslot 312 and thus determined a network node of stratum level 2 to be the new synchronization target, as shown in FIGS. 4B and 5B, network device 210b may reselect synchronization signal timeslot 313 corresponding to stratum level 3 (stratum level 2+1) for transmission of its synchronization signal as shown in FIGS. 4C and 5C. Likewise, each network device downstream to network device 210b will, in turn, detect a synchronization signal in a timeslot of stratum index subcycle 310 and reselect a synchronization signal timeslot of stratum index subcycle corresponding to their respective stratum level according to embodiments. For example, network device 210b will initiate transmission of its synchronization signal in synchronization signal timeslot 313 which will be detected by network node 210e, whereby network node 210e will reselect synchronization signal timeslot 314 corresponding to stratum level 4 for transmission of its synchronization signal as shown in FIGS. 4C and 5C. Similarly, network device 210e will initiate transmission of its synchronization signal in synchronization signal timeslot 314 which will be detected by network node 210d, whereby network node 210d will reselect synchronization signal timeslot 315 corresponding to stratum level 5 for transmission of its synchronization signal as shown in FIGS. 4C and 5C.

In the example of FIGS. 4A-C and 5A-C, network device 210b is operable to determine a new synchronization target from detection of a synchronization signal present in a synchronization signal timeslot of the instance of synchronization signal pattern cycle 300 in which loss of parent network device 210a was determined, and thus prior to a time of artificial stratum index subcycle 320 of that instance of synchronization signal pattern cycle 300. Accordingly, the time in which network device 210b is without a synchronization target is relatively short (e.g., the time offset between synchronization signal timeslots in the example). In operation according to embodiments, however, the network device may continue to monitor synchronization signal timeslots in one or more subsequent instances of synchronization signal pattern cycle 300 for determining a new synchronization target (e.g., to provide for detecting a synchronization signal for an available neighboring device of a lower (better) stratum level than that the network device was previously of), such as where a network device has not detected a synchronization signal in a synchronization signal timeslot of the instance of synchronization signal pattern cycle 300 in which loss of the parent network device was determined and continues to search for the synchronization signal for an available neighboring device of a same or lower (better) stratum level than that the network device was previously of, or where a network device has detected a synchronization signal in a synchronization signal timeslot of the instance of synchronization pattern cycle 300 in which loss of the parent network device as determined but nevertheless continues to search for the synchronization signal for an available neighboring device of a same or lower (better) stratum level than that the network device was previously of (e.g. the network device attempts to select an available neighboring network node having a lowest stratum level).

In operation according to embodiments, where network device 210b has not detected a synchronization signal of an available synchronization target in a synchronization signal timeslot of stratum index subcycle 310 of an instance of synchronization signal pattern cycle 300, network device 210b may proceed to monitor one or more synchronization signal timeslot of artificial stratum index subcycle 320 of that instance of synchronization signal pattern cycle 300. Such monitoring of synchronization signal timeslot of artificial stratum index subcycle 320 of an instance of synchronization signal pattern cycle 300 may be followed by monitoring of synchronization signal timeslots of stratum index subcycle 310 of a subsequent instance of synchronization signal pattern cycle 300, such as to determine an available synchronization target at a lower (better) stratum level or to otherwise continue searing for a synchronization target.

It should be appreciated that, although artificial stratum index subcycle 320 of embodiments comprises synchronization signals only for those network devices that have lost connection to the global synchronization source, network device 210b and/or its downstream network devices operate to monitor timeslots of artificial stratum index subcycle 320 in situations where a connection to the global synchronization source has not been reestablished (e.g., a new synchronization target selected). For example, assuming network device 210b does not detect the synchronization signal of another network device prior to artificial stratum index subcycle 320, network device 210b may operate to monitor artificial synchronization signal timeslots up to the artificial synchronization signal timeslot (i.e., timeslot of the artificial stratum index subcycle to which synchronization signal transmission has been reassigned) related to the synchronization signal index of its former parent network device 210a (e.g., the artificial synchronization signal timeslot corresponding to stratum level 1+N) to obtain an isolated island synchronization signal (e.g., a synchronization signal useful in synchronizing the operation of a branch of network devices from the synchronization tree that have been isolated from the global synchronization source due to a failure in a link to a parent network device) in the case that network device 210a did not fail but instead lost its connection to the global synchronization source. Additionally or alternatively, assuming that the network devices downstream from network device 210b (e.g., network devices 210d, 210e, etc.) do not detect the synchronization signal of another network device prior to artificial stratum index subcycle 320, these network devices may operate to at least monitor an artificial synchronization signal timeslot related to the synchronization signal index of their former parent network device (e.g., network device 210b for network device 210e and network device 210e for network device 210d) to obtain an isolated island synchronization signal. The network devices of the synchronization tree that have been isolated from the global synchronization source may thus continue to provide synchronous operation with respect to each other using such isolated island synchronization signals, although their synchronization may drift from that of the global synchronization source, and thus that of the remainder of the synchronization tree, over time.

In operation according to embodiments, a network device implementing synchronization signal timeslot reselection for synchronization target selection attempts to select an available neighboring network node having a lowest stratum level to thereby provide a least number of hops to the global synchronization source. Accordingly, although a network node having lost connection with a current parent network device may determine a new synchronization target from a synchronization signal detected in the instance of the synchronization signal pattern cycle in which loss of parent network device was determined, the network node proceeds to monitor all synchronization signal timeslots of the stratum index subcycle to determine if an available network node has a lower (better) stratum level. For example, although network device 210b detects the synchronization signal of network device 510h in synchronization signal timeslot 312 of stratum index subcycle 310 of an instance of synchronization signal pattern cycle 300 in which connection to network device 210a was lost, network device 210b may nevertheless proceed to monitor synchronization signal timeslots (e.g., synchronization signal timeslot 311 corresponding to stratum level 1) of stratum index subcycle 310 of one or more subsequent instances of synchronization signal pattern cycle 300 to thereby monitor each timeslot of stratum index subcycle 310 at least once.

Figure 6:
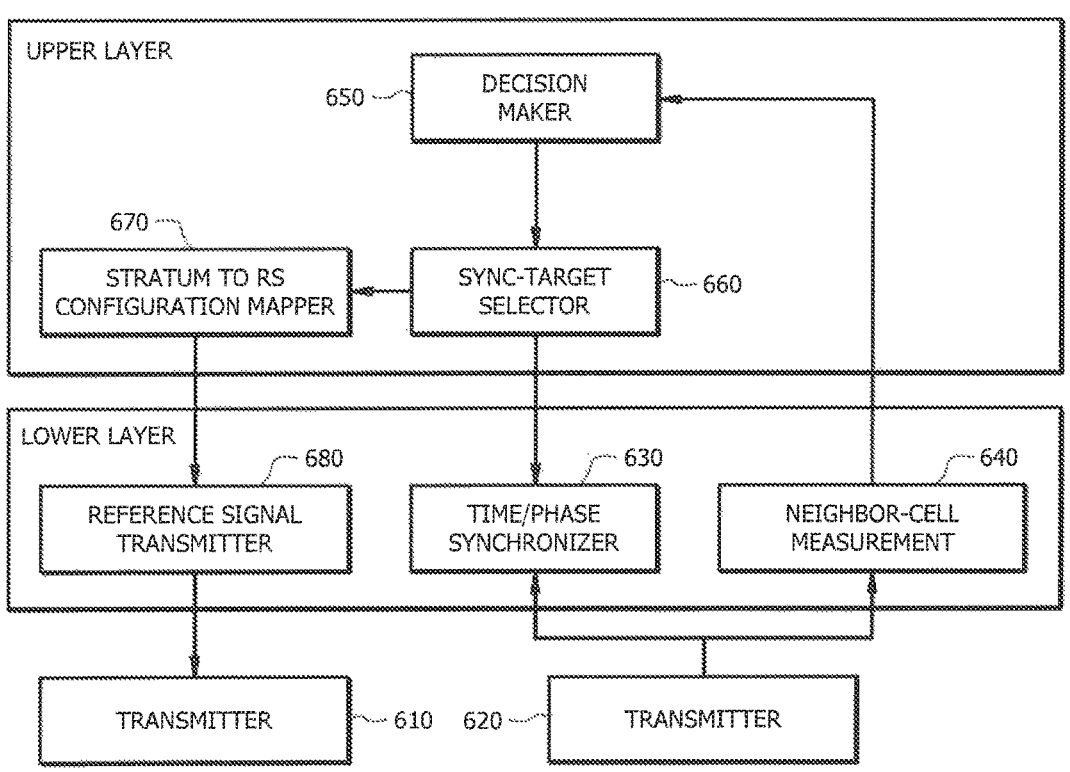
FIG. 6 illustrates a block diagram of an exemplary system configured with capabilities and functionality according to aspects of the present invention.

Having described aspects of embodiments of the present invention implementing synchronization signal timeslot reselection for facilitating selection of a new synchronization target, a block diagram of an exemplary processor based system configured in accordance with concepts herein is now described with reference to FIG. 6. System 600 of the embodiment illustrated in FIG. 6 is adapted to implement synchronization signal timeslot reselection and provide synchronization target selection in a wireless network. In accordance with embodiments, system 600 may be a network device, such as any of network devices 210a-g operating in a wireless communication network (e.g., network 200). As shown in FIG. 6, system 600 includes a transmitter 610, receiver 620, neighbor cell measurement 640, time/phase synchronizer 630, reference signal transmitter 680, stratum to RS configuration mapper 670, decision maker 650, and sync-target selector 660.

It should be appreciated that the various modules illustrated in FIG. 6, or portions thereof, may be implemented as code segments (e.g., software, firmware, and/or hardware logic) to perform the tasks and functions described herein. Such code segments may be executed by one or more processor (e.g., a central processing unit (CPU), an application specific integrated circuit (ASIC), a programmable gate array (PGA), one or more core processors of a multicore processor, etc.) of system 600 to provide operation of embodiments herein. The code segments can be stored in a processor readable medium, such as may include any medium (e.g., non-transitory storage medium) that can appropriately store the information. Examples of a processor readable medium of embodiments include an electronic circuit, a semiconductor memory device, a read only memory (ROM), a flash memory, an erasable ROM (EROM), a compact disk ROM (CD-ROM), an optical disk, a hard disk, etc.

Transmitter 610 and receiver 620 may include hardware and/or software for transmitting and receiving data, through a transmission medium, to and from a receiver and transmitter. Although transmitter 610 and receiver 620 are illustrated as separate entities, in some aspects, they are included in a single module (e.g., a transceiver) that provides transmitting and receiving operations. In particular, transmitter 610 may be used to transmit signals that may be used by other network devices to measure signal strength and quality to determine whether system 600 may be available to serve as a synchronization target for another network device, in accordance with the operations discussed above. Additionally, transmitter 610 may also be used to transmit synchronization signals that may be used by children network devices to synchronize to system 600.

In some aspects, transmitter 610 may be used, in cooperation with stratum to RS configuration mapper 670 and reference signal transmitter 680, to transmit synchronization signals in a synchronization signal timeslot corresponding to the stratum index of system 600 or a reselected synchronization signal timeslot corresponding to an artificial stratum index. For example, stratum to RS configuration mapper 670 may operate to map the synchronization signal transmitted by system 600 to a particular timeslot of synchronization signal cycle pattern 300 (e.g., a timeslot within an appropriate one of stratum index subcycle 310 or artificial stratum index subcycle 320 corresponding to the stratum index/artificial stratum index selected for system 600, such as by sync-target selector 660). The mapping may be then provided to reference signal transmitter 680. Accordingly, reference signal transmitter 680 of embodiments may thus be scheduled to transmit a synchronization signal, such as may be used by downstream network devices, in an appropriate synchronization signal timeslot. Reference signal transmitter 680 may thus generate the synchronization signal based on the mapping determined by the stratum index. The synchronization signal may be provided to transmitter 610 for broadcast to other network devices within the appropriate synchronization signal timeslot, such that a receiving network device may obtain the stratum index by determining the particular synchronization signal timeslot mapping used in the transmission of the reference signal.

Receiver 620 may be used to receive signals at system 600. The received signals may include reference signals (e.g., synchronization signals of embodiments herein) transmitted from other network devices, as discussed above. These reference signals may indicate a stratum value of the network device from which the signals are received (e.g., the particular synchronization signal timeslot within synchronization signal cycle pattern 300 may indicate the stratum level of the transmitting network device, as discussed above). In some aspects, receiver 620 may be used, in cooperation with neighbor cell measurement 640, to receive and process signals that may be used to measure the status of a communication link between system 600 and a synchronization target network device of system 600. For example, neighbor cell measurement 640 may process signals received via receiver 620 from a synchronization target network device. In some aspects, neighbor cell measurement 640 processes the signals and provides the measurement to decision maker 650 to determine the status of the communication link with the synchronization target network device. The status of the communication link may be determined by decision maker 650 based on the instantaneous or ensemble statistics of historical strength and/or quality measurements of the received signal. The strength and/or quality measurements of the signal may include, without limitation, RSSI, RSRP, RSRQ, SINR, timing offset with respect to each neighbor device, etc. Based on the status of the communication link, decision maker 650 may determine that connection to a current synchronization target has been lost, that selection of a new synchronization target may be appropriate, etc. Thus, receiver 620, neighbor cell measurement 640, and/or decision maker 650 of embodiments may determine whether a link between a network device and a synchronization target has failed. Furthermore, receiver 620, neighbor cell measurement 640, and/or decision maker 650 may also be used to trigger reselection of a synchronization signal timeslot and operation for selection of a new synchronization target.

In operation according to embodiments, receiver 620, neighbor cell measurement 640, and/or decision maker 650 may be used to receive and process signals that may be used to measure signal strength and quality, to measure timing offsets with respect to neighbor network devices, and to determine whether a network device transmitting these signals may be available to serve as a synchronization target for system 600, as described above. For example, system 600 may use neighbor cell measurement 640 and receiver 620 to measure the signal strength and quality of signals from neighbor network devices. In various aspects, system 600 may use neighbor cell measurement 640 and receiver 620 to measure the timing offset between system 600 and the neighbor network devices from which signals are received. Decision maker 650 may be used to identify those neighbor network devices that are available to serve as synchronization targets, and/or also those network devices that are unavailable to serve as synchronization targets, based on the measurements from neighbor cell measurement 640 and receiver 620.

Additionally or alternatively, receiver 620 may be used to receive synchronization signals from the synchronization target network device of system 600, as described above. For example, receiver 620 and time/phase synchronizer 630 may be used to synchronize system 600 based on signals received from a synchronization target network device. Signals received from a synchronization target network device may be used by time/phase synchronizer 630 to adjust timing differences with respect to the signals as transmitted from the synchronization target network device and as received by system 600.

Sync-target selector 660 may be configured to provide operation to select a synchronization target for system 600 and to provide synchronization signal timeslot reselection in accordance with the concepts herein. In aspects, sync-target selector 660 may be configured to perform the selection of a synchronization target within specific constraints, as discussed above. In particular, sync-target selector 660 may be configured to perform selection of a synchronization target without resulting in a synchronization loop. In operation according to embodiments, sync-target selector 660 may be configured with a plurality of procedures, including an upgrade procedure and a downgrade procedure. The following description of the functions, procedures, and operations of sync-target selector 660 is made with reference to the diagram illustrating example blocks executed to implement aspects of the present disclosure shown in FIG. 6. It is noted that the process according to the example aspect illustrated by FIG. 6 may be implemented in a network, such as wireless network 200. Operation in accordance with an upgrade procedure and downgrade procedure in which synchronization signal timeslot reselection is implemented for synchronization target selection is illustrated in FIG. 7, the functions of which may be implemented by sync-target selector 660 of embodiments.

Figure 7:
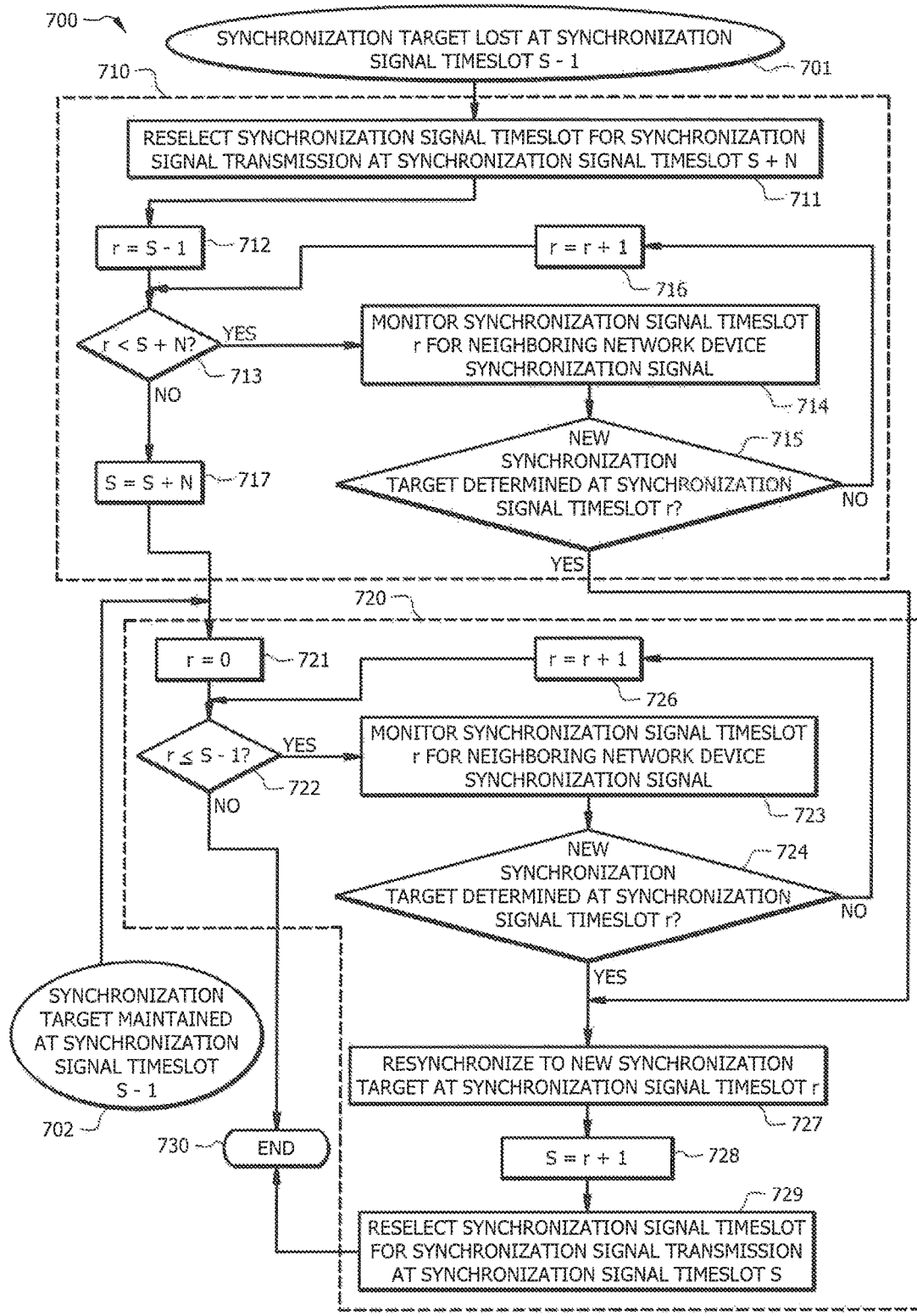
FIG. 7 illustrates a block diagram of a flow as may be implemented by an exemplary system, such as that of FIG. 6, configured with capabilities and functionality according to aspects of the present invention.

Flow 700 of FIG. 7 shows operation to provide for selection of a synchronization target using synchronization signal timeslot reselection according to embodiments herein. It should be appreciated that the illustrated embodiment of flow 700 includes a downgrade procedure (shown as including the functional blocks of stratum downgrade procedure 710) and an upgrade procedure (shown as including the functional blocks of stratum upgrade procedure 720), in accordance with an exemplary embodiment.

At block 701 of the illustrated embodiment of flow 700, a network device detects that it is unable to receive, or unable to reliably receive, synchronization signals from its current synchronization target. For example, network device 210b of FIG. 2A may determine that it is unable to receive, or unable to reliably receive, synchronization signals from synchronization target network device 210a, such that synchronization of network device 210b to network device 210a may not be accomplished. In response, network device 210b may reselect the synchronization signal timeslot for transmission of synchronization signals by network device 210b in accordance with concepts of the present invention. Thus, processing according to flow 700 of the illustrated embodiment proceeds to the functional blocks of stratum downgrade procedure 710.

At block 711 of the illustrated embodiment of stratum downgrade procedure 710 implemented in flow 700, the network device (e.g., network device 210b) operates to reselect the synchronization signal timeslot for the synchronization signal transmitted by the network device (e.g., logic of sync-target selector 660 may operate to control stratum to RS configuration mapper 670) to a synchronization signal timeslot corresponding to an artificial stratum index (e.g., the current stratum level index, s, for network device 210b plus a tree depth value, N, such that the reselected synchronization signal timeslot=s+N). Thereafter, in accordance with the flow of the illustrated embodiment, the network device proceeds to search for a new synchronization target by monitoring synchronization signal timeslots of synchronization signal pattern cycle 300.

In performing monitoring of synchronization signal timeslots of synchronization signal pattern cycle 300 according to the illustrated embodiment, synchronization signal timeslot receive index, r, is set to be an initial value for synchronization target searching at block 712. For example, the stratum index for the network device (e.g., network device 210b) may be s and thus the current stratum index for the lost synchronization target (e.g., (e.g., network device 210a) may be s−1, wherein the synchronization signal timeslot receive index, r, may be set to be the current stratum index for the lost synchronization target (e.g., r=s−1). Thereafter, the illustrated embodiment proceeds to block 713 where a determination is made regarding whether the synchronization signal timeslot receive index, r, (as will be incremented in the synchronization target search of stratum downgrade procedure 710) is less than the reselected synchronization signal timeslot (e.g., r<s+N) for network device 210b to ensure that a downstream network device (i.e., child network device of network device 210b) is not selected as the new synchronization target. That is, as described above for operation according to embodiments, synchronization signal timeslot reselection propagates to downstream network devices as the synchronization signal of a parent network device is reselected and a synchronization signal thereof is scheduled for transmission in a later synchronization timeslot (e.g., an artificial stratum level corresponding to an artificial stratum index) and thus the reselected synchronization signal timeslots of network devices downstream to network device 210b will each propagate to be greater than the reselected synchronization signal timeslot of network device 210b (i.e., greater than s+N).

If it is determined at block 713 that the synchronization signal timeslot receive index, r, is less than the reselected synchronization signal timeslot (e.g., r<s+N) for the network device searching for a new synchronization target, processing according to the illustrated embodiment proceeds to block 714 for operation for determining a new synchronization target. If, however, it is determined at block 713 that the synchronization signal timeslot receive index, r, is not less than the reselected synchronization signal timeslot (e.g., r<s+N) for the network device searching for a new synchronization target, processing according to the illustrated embodiment proceeds to block 717 to set the stratum index for the network device to an appropriate stratum index (e.g., s=s+N) and then to block 721 wherein synchronization signal timeslots of a later instance of synchronization signal pattern cycle 300 may be searched to determine a synchronization target of a lower (better) or higher (worse) stratum level than that of the synchronization target that was lost.

At block 714 of the exemplary embodiment of FIG. 7, the network device (e.g., network device 210b) monitors synchronization signal timeslot for the synchronization signal timeslot receive index, r, for the synchronization signal of a neighboring device. Thereafter, at block 715 of the illustrated embodiment, a determination is made regarding whether a synchronization signal was received, or reliably received, indicating that a neighboring network device is available for use as a synchronization target. It should be appreciated that, due to the reselection of synchronization signal timeslots propagating to the network devices downstream from the network device (e.g., network device 210b) searching for a new synchronization target according to embodiments herein, an available neighboring network device detected at block 714 is also a network device that is suitable as a synchronization target as it is not a downstream network device (i.e., not a child network device to network device 210b) and thus may be determined to be a new synchronization target without forming a synchronization loop.

If it is determined at block 715 that a new synchronization target was detected, processing according to the illustrated embodiment proceeds to block 727 for synchronizing with the new synchronization target in accordance with stratum upgrade procedure 720. If, however, it is determined at block 715 that a new synchronization target was not detected, processing according to the illustrated embodiment proceeds to block 716 for incrementing the synchronization signal timeslot receive index, r, to monitor for a new synchronization target in a subsequent synchronization signal timeslot and processing proceeds to block 713 for operation to determine whether the synchronization signal timeslot receive index, r, (as incremented) is less than the reselected synchronization signal timeslot (e.g., r<s+N) for network device 210b as described above. If it is determined that the synchronization signal timeslot receive index, r, is less than the reselected synchronization signal timeslot for the network device searching for a new synchronization target at block 714, processing proceeds to block 714 for operation as discussed above. However, if it is determined that the synchronization signal timeslot receive index, r, is not less than the reselected synchronization signal timeslot for the network device searching for a new synchronization target at block 714, processing proceeds to block 721 for searching synchronization signal timeslots of a later instance of synchronization signal pattern cycle 300.

At block 721 of the illustrated embodiment, the synchronization signal timeslot receive index, r, is set to a value to monitor for a new synchronization target in a synchronization signal timeslot earlier in the synchronization signal pattern cycle 300 (e.g., synchronization signal timeslots at the beginning of a later instance of synchronization signal pattern cycle 300). For example, the synchronization signal timeslot receive index, r, is set to zero (i.e., r=0) in accordance with the exemplary embodiment to provide for monitoring a synchronization signal timeslot corresponding to the global synchronization target. Thereafter, the illustrated embodiment proceeds to block 722 where a determination is made regarding whether the synchronization signal timeslot receive index, r, (as will be incremented in the synchronization target search procedure) is less than or equal to the current stratum index−1 or current artificial stratum index−1, s−1, to provide for searching earlier synchronization signal timeslots and stopping the searching after all synchronization timeslots from timeslot 0 up to but not including the current stratum timeslot or current artificial stratum timeslot, s, have been monitored.

If it is determined at block 722 that the synchronization signal timeslot receive index, r, is less than or equal to the stratum index of the lost synchronization target, s−1, processing according to the illustrated embodiment proceeds to block 723 for operation for determining a new synchronization target. If, however, it is determined at block 722 that the synchronization signal timeslot receive index, r, is not less than or equal to the stratum index for the lost synchronization target, s−1, processing according to the illustrated embodiment proceeds to block 730 for ending the operation to provide for selection of a synchronization target using synchronization signal timeslot reselection according to illustrated embodiment of flow 700 (e.g., all synchronization signal timeslots of stratum index subcycle 310 of synchronization signal pattern cycle 300 have been monitored).

At block 723 of the exemplary embodiment of FIG. 7, the network device (e.g., network device 210b) monitors synchronization signal timeslot for the synchronization signal timeslot receive index, r, for the synchronization signal of a neighboring device. Thereafter, at block 724 of the illustrated embodiment, a determination is made regarding whether a synchronization signal was received, or reliably received, indicating that a neighboring network device is available for use as a synchronization target. It should be appreciated that, the synchronization signal timeslot index, r, may correspond to a stratum index that is lower (better) or higher (worse) than the stratum index of the network device prior to its loss of its synchronization target, and yet an available neighboring network device detected at block 724 is ensured to be a network device that is suitable as a synchronization target as it is not a downstream network device (i.e., not a child network device to network device 210b).

If it is determined at block 724 that a new synchronization target was detected, processing according to the illustrated embodiment proceeds to block 727 for synchronizing with the new synchronization target in accordance with stratum upgrade procedure 720. If, however, it is determined at block 724 that a new synchronization target was not detected, processing according to the illustrated embodiment proceeds to block 726 for incrementing the synchronization signal timeslot receive index, r, to monitor for a new synchronization target in a subsequent synchronization signal timeslot and processing proceeds to block 722 for operation to determine whether the synchronization signal timeslot receive index, r, (as incremented) is less than or equal to the stratum index for the lost synchronization target (e.g., r≤s−1) as described above.

Processing at block 727 of the illustrated embodiment, whether initiated by a determination that a new synchronization target has been detected at block 715 or block 724, provides operation for synchronizing with the new synchronization target in accordance with stratum upgrade procedure 720. For example, the network device (e.g., network device 210b) may operate to resynchronize its transmission and reception in accordance with the synchronization signal received at the synchronization signal timeslot of synchronization signal timeslot index r. Thereafter, the illustrated embodiment of flow 700 proceeds to block 728 wherein the current stratum index is set to the stratum index for the synchronization signal timeslot of the detected new synchronization target plus one (e.g., s=r+1).

In operation according to stratum upgrade procedure 720 of the illustrated embodiment, processing proceeds to block 729 wherein the synchronization signal timeslot is reselected for synchronization signal transmission at the synchronization signal timeslot of the new stratum level. For example, the synchronization signal timeslot for network device 210b may be set to correspond to the synchronization signal timeslot of stratum level s determined in in block 728. Thereafter, processing according to the illustrated embodiment proceeds to block 730 for ending the operation to provide for selection of a synchronization target using synchronization signal timeslot reselection according to illustrated embodiment of flow 700 (e.g., a highest stratum level synchronization target available has been selected as the new synchronization target).

As can be appreciated from the foregoing, in operation to provide for selection of a synchronization target using synchronization signal timeslot reselection according to flow 700 of embodiments a network device may monitor the synchronization signal of its synchronization target at synchronization signal timeslot k corresponding to the stratum level index of the synchronization target, and transmits its own synchronization signal at the next following synchronization signal timeslot k+1 corresponding to the stratum level index of the network device. For example, in accordance with embodiments, the synchronization signal timeslots may each be associated with an integer number from 0 to 2N−1 and the 2N synchronization signal timeslots form one synchronization signal pattern cycle that repeats one cycle after another cycle, wherein $0 \leq k < N$ within all the 2N synchronization signal timeslots of the synchronization signal pattern cycle. When a network device detects a failure to receive the synchronization signal of its synchronization target (e.g., a loss of synchronization from its synchronization target), the network device may implement a stratum downgrade procedure in which synchronization timeslots of a synchronization signal pattern cycle are monitored for searching for a new synchronization target, wherein a neighboring network device having an equal or higher (equal or worse) stratum level can be selected as the new synchronization target without forming synchronization loop. The network device may further monitor synchronization timeslots of the synchronization signal pattern cycle for searching for a new synchronization target having a lower (better) stratum level than that of the lost synchronization target. A network device detecting a neighboring network device with a lower (better) stratum level may implement a stratum upgrade procedure in which the neighboring network device having the lower stratum level may be selected as the new synchronization target and the time synchronization accuracy of the network device and its downstream network devices can be improved.

The aforementioned stratum downgrade procedure implemented according to embodiments may include a network device monitoring for a synchronization signal of its current synchronization target at synchronization signal timeslot k (e.g., a synchronization signal timeslot corresponding to the stratum level of the current synchronization target), and upon determining that the network device is unable to receive, or reliably receive the synchronization signal, stopping transmission of the synchronization signal by the network device at synchronization signal timeslot k+1 (e.g., a synchronization signal timeslot corresponding to the stratum level of the network device). Thereafter, the network device may search for a new synchronization target by monitoring for neighboring network devices' synchronization signals. For example, the network device may monitor for neighboring network device synchronization signals at synchronization signal timeslot k, if not found then monitoring for neighboring network device synchronization signals at synchronization signal timeslot k+1, and if not found then repeating further until a new synchronization signal is discovered at synchronization signal timeslot k', where $k \leq k' < k+N$, or until no new synchronization signal is discovered at all timeslots k, k+1, . . . , k+N−1. Where a synchronization signal is received by the network device at synchronization signal timeslot k', the network device of embodiments may resume transmission of its synchronization signal at synchronization signal timeslot k'+1, otherwise the network device may transmit its synchronization signal at synchronization signal timeslot k+N (e.g., a synchronization signal timeslot corresponding to an artificial stratum level for the network device) when no synchronization signal is received at any of synchronization signal timeslots k, k+1, . . . , k+N−1.

The aforementioned stratum upgrade procedure implemented according to embodiments may include a network device monitoring for a synchronization signal of its synchronization target (e.g., a new synchronization target determined in the foregoing downgrade procedure) at synchronization signal timeslot k or k+N while also attempting to discover a synchronization signal of a new synchronization target. For example, the network device may monitor for neighboring network device synchronization signals at synchronization signal timeslot 0, if not found then monitoring for neighboring network device synchronization signals at synchronization signal timeslot 1, and if not found then repeating further until a new synchronization signal is discovered at timeslot k', where $0 \leq k' < k$; or no new synchronization signal is discovered at all synchronization signal timeslots 0, 1, . . . , k−1. Where a synchronization signal is received by the network device at synchronization signal timeslot k', the network device of embodiments may change its synchronization signal transmission to synchronization signal timeslot k'+1, otherwise the network device may remain with the previous synchronization target and continue transmitting its synchronization signal in synchronization signal k+1.

Moreover, the stratum upgrade procedure of embodiments may be utilized for implementing a stratum upgrade of a network device when a better stratum synchronization target comes online. For example, a network device maintaining synchronization with a synchronization target at synchronization signal timeslot s−1 may nevertheless enter stratum upgrade procedure 720 from block 702 of the illustrated embodiment for operation to detect a better stratum synchronization target and implementation of an upgrade procedure in the case a better stratum synchronization target is detected.

It can be appreciated from the above described operation providing synchronization signal timeslot reselection for synchronization target selection according to flow 700 of FIG. 7 that embodiments of the invention provide for coordinating stratum modification of a group of synchronized network devices by downgrading a current stratum index to an artificial stratum index that does not accurately indicate a number of hops between the network device and a global synchronization source. By reselecting the synchronization signal timeslot to such an artificial stratum index, embodiments of the present invention allow for selection of available synchronization targets with stratum indices higher than that of the failed synchronization target while ensuring that the network device does not select one of its own downstream children network devices as its synchronization target. Moreover, by providing for monitoring of each synchronization signal timeslot of the stratum index subcycle of a synchronization signal pattern cycle of embodiments, a highest stratum level available synchronization target is selected according to flow 700 described above.

It should be appreciated that, although exemplary embodiments have been described with reference to wireless networks and/or wireless communications, the concepts herein are not limited to applicability to wireless implementations. For example, time synchronization in either wired or wireless networks may be important, such as to facilitate successful communication between nodes on the network. Accordingly, embodiments operable in accordance with the concepts herein may be implemented in any communication system, including wired communication systems, optical communication systems, etc., in which synchronization of network devices is desired. However, time synchronization may be particularly vital for wireless networks, wherein wireless time synchronization techniques implemented according to the concepts herein may be used for many different purposes including location, proximity, energy efficiency, and mobility.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the concepts herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Skilled artisans will also readily recognize that the order or combination of components, methods, or interactions that are described herein are merely examples and that the components, methods, or interactions of the various aspects of the present invention may be combined or performed in ways other than those illustrated and described herein.

Functional blocks and modules in FIGS. 6 and 7 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the invention herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the invention herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising;
   monitoring, by a network device, for a synchronization signal transmitted by a first synchronization target network device at synchronization signal timeslot k, wherein the network device is operating in synchronization with the first synchronization target network device based upon previously receiving a synchronization signal from the first synchronization target network device, wherein the synchronization signal timeslot k corresponds to a stratum level of the first synchronization target network device within a synchronization tree, and wherein the synchronization signal timeslot is a synchronization signal timeslot of N synchronization signal timeslots each of which corresponds to a different stratum level of the synchronization tree and $0 \leq k < N$;
   transmitting, by the network device when the synchronization signal transmitted by the first synchronization target network device is received by the network device at a synchronization signal timeslot k, a network device synchronization signal at synchronization signal timeslot k+1 for synchronizing operation of network devices downstream from the network device in the synchronization tree, wherein the synchronization signal timeslot k+1 corresponds to a stratum, level of the network device within the synchronization tree; and performing, by the network device when the synchronization signal transmitted by the first synchronization target network device is not received by the network device at the synchronization signal timeslot k, a stratum level downgrade procedure configured for searching for a second synchronization target network device having a synchronization tree stratum level equal to or higher than the synchronization tree stratum level of the network device.

2. The method of claim 1, wherein the stratum level downgrade procedure comprises:

reselecting, by the network device, synchronization signal timeslot k+1+N corresponding to an artificial stratum index for scheduling transmission of the network device synchronization signal during searching for the second synchronization target network device by the network device.

3. The method of claim 2, wherein the stratum level downgrade procedure further comprises:

stopping, by the network device, transmission of the synchronization signal at the synchronization signal timeslot k+1.

4. The method of claim 2, further comprising:

reselecting, by the network device when a synchronization signal transmitted by a neighboring network device available to be used as the second synchronization target network device is received in synchronization signal timeslot id during the searching for the second synchronization target network device, synchronization signal timeslot k'+1 corresponding to a new stratum level index of the network device for transmission of the network device synchronization signal.

5. The method of claim 1, further comprising:

performing, by the network device when a synchronization signal transmitted by a neighboring network device available to be used as the second synchronization target network device is received in synchronization signal timeslot k' during the searching for the second synchronization target network device, a stratum level upgrade procedure configured for decreasing a synchronization tree stratum level index of the network device based upon a synchronization tree stratum level of the neighboring network device transmitting the synchronization signal received by the network device at synchronization signal timeslot k'.

6. The method of claim 5, wherein the stratum level upgrade procedure comprises:

reselecting, by the network device, synchronization signal timeslot k'+1 for transmission of the network device synchronization signal.

7. The method of claim 5, wherein k'≥k.

8. The method of claim 5, wherein k'<k.

9. The method of claim 1, wherein synchronization signal timeslot k and synchronization signal timeslot k+1 are timeslots of a plurality of timeslots comprising 2N synchronization signal timeslots forming a synchronization signal pattern cycle, and wherein the synchronization signal pattern cycle is repeated for providing network synchronization.

10. The method of claim 9, wherein the synchronization signal pattern cycle comprises a plurality of subcycles, wherein a first subcycle of the plurality of subcycles comprises synchronization signal timeslots corresponding to synchronization tree stratum levels including synchronization signal timeslot k and synchronization signal timeslot k+1, and wherein a second subcycle of the plurality of subcycles comprises synchronization signal timeslots corresponding to artificial stratum levels including the synchronization signal timeslot corresponding to an artificial stratum index.

11. The method of claim 1, wherein the synchronization signal transmitted by the first synchronization target network device includes information selected from the group consisting of information regarding an extent of time misalignment between the first synchronization target network device and the network device, information regarding identification of the first synchronization target network device, and information 'from which one or more signal reception quality metrics can be determined by the network device.

12. A system comprising:

a network device having a receiver and transmitter for data communication in a network, the network device configured to:

monitor for a synchronization signal transmitted by a first synchronization target network device at synchronization signal timeslot k, wherein the synchronization signal timeslot k corresponds to a stratum level of the first synchronization target network device within a synchronization tree, and wherein the synchronization signal timeslot k is a synchronization signal timeslot of N synchronization signal timeslots each of which corresponds to a different stratum level of the synchronization tree and 0≤k<N;

transmit a network device synchronization signal at synchronization signal timeslot k+1 for synchronizing operation of network devices downstream from the network device in the synchronization tree when the synchronization signal transmitted by the first synchronization target network device is received by the network device at the synchronization signal timeslot k, wherein synchronization signal timeslot k+1 corresponds to a stratum level of the network device within the synchronization tree; and perform a stratum level downgrade procedure configured for searching for a second synchronization target network device having a synchronization tree stratum level equal to or higher than the synchronization tree stratum level of the network device when the synchronization signal transmitted by the first synchronization target network device is not received by the network device at synchronization signal timeslot k.

13. The system of claim 12, wherein to perform the stratum level downgrade procedure the network device is configured to:

reselect synchronization signal timeslot k+1+/V corresponding to an artificial stratum index for scheduling transmission of the network device synchronization signal during searching for the second synchronization target network device by the network device.

14. The system of claim 13, wherein to perform the stratum level downgrade procedure the network device is further configured to:

stop transmission of the synchronization signal at the synchronization signal timeslot k+1.

15. The system of claim 13, wherein the network device is further configured to:

reselect synchronization signal timeslot N+1 corresponding to a new stratum level index of the network device for transmission of the network device synchronization signal when a synchronization signal transmitted by a neighboring network device available to be used as the second synchronization target network device is received in synchronization signal timeslot k' during the searching for the second synchronization target network device.

16. The system of claim 12, wherein the network device is further configured to:
  perform a stratum level upgrade procedure configured for decreasing a synchronization tree stratum level index of the network device based upon a synchronization tree stratum level of a neighboring network device transmitting the synchronization signal received by the network device at synchronization signal timeslot k' when a synchronization signal transmitted by a neighboring network device available to be used as the second synchronization target network device is received in synchronization signal timeslot N during the searching for the second synchronization target network device.

17. The system of claim 16, wherein to perform the stratum level upgrade procedure the network device is configured to:
  reselect synchronization signal timeslot k'+1 for transmission of the network device synchronization signal.

18. The system of claim 12, wherein the synchronization signal timeslot k and the synchronization signal timeslot k+1 are timeslots of a plurality of timeslots comprising IN synchronization signal timeslots forming a synchronization signal pattern cycle, and wherein the synchronization signal pattern cycle is repeated for providing network synchronization.

19. The system of claim 18, wherein the synchronization signal pattern cycle comprises a plurality of subcycles, wherein a first subcycle of the plurality of subcycles comprises synchronization signal timeslots corresponding to synchronization tree stratum levels including the synchronization signal timeslot k and the synchronization signal timeslot k+1, and wherein a second subcycle of the plurality of subcycles comprises synchronization signal timeslots corresponding to artificial stratum levels including the synchronization signal timeslot, corresponding to an artificial stratum index.

20. The system of claim 12, wherein the synchronization signal transmitted by the first synchronization target network device includes information selected from the group consisting of information regarding an extent of time misalignment between the first synchronization target network device and the network device, information regarding identification of the first synchronization target network device, and information from which one or more signal reception quality metrics can be determined by the network device.

21. A synchronization signal timeslot reselection method for synchronization target selection in a network, the method comprising:
  monitoring, by a network device, for a synchronization signal of a first synchronization target network device of the network device in a synchronization signal timeslot corresponding to a synchronization tree stratum index of the first synchronization target network device, wherein the network device is operable to transmit the synchronization signal in the synchronization signal timeslot corresponding to a synchronization tree stratum index of the network device when the synchronization signal of the first synchronization target network device is received by the network device in the synchronization signal timeslot corresponding to the synchronization tree stratum index of the first synchronization target network device;

determining, by the network device, that the synchronization signal of the first synchronization target network device of the network device has not been received by the network device in the synchronization signal timeslot corresponding to the synchronization tree stratum index of the first synchronization target network device;
  reselecting a synchronization signal timeslot corresponding to an artificial stratum index for scheduling transmission of the synchronization signal in a synchronization signal timeslot corresponding to the artificial stratum index during a search for a second synchronization target network device by the network device, wherein the network device is operable to stop transmitting the synchronization signal in the synchronization signal timeslot corresponding to the synchronization tree stratum index of the network device when the synchronization signal of the first synchronization target network device is determined to have been received by the network device in the synchronization signal timeslot corresponding to the synchronization tree stratum index of the first synchronization target network device; and initiating, by the network device, the search for the second synchronization target network device.

22. The method of claim 21, wherein the search for the second synchronization target network device comprises:
  monitoring, by the network device, synchronization signal timeslots corresponding to synchronization tree stratum indices equal to and higher than the synchronization tree stratum index of the network device for a neighboring network device suitable for use as the second synchronization target network device by the network device.

23. The method of claim 22, further comprising:
  reselecting the synchronization signal timeslot for the transmission of the network device synchronization signal based upon a stratum index of a network device transmitting a received synchronization signal if the network device receives the received synchronization signal in the synchronization signal timeslot corresponding to the synchronization tree stratum index equal to or higher than the synchronization tree stratum index of the network device.

24. The method of claim 22, wherein the search for the second synchronization target network device comprises:
  monitoring, by the network device, the synchronization signal timeslots corresponding to synchronization tree stratum indices lower than the synchronization tree stratum index of the network device for a neighboring network device suitable for use as the second synchronization target network device by the network device.

25. The method of claim 24, further comprising:
  reselecting the synchronization signal timeslot for transmission of the network device synchronization signal based upon the synchronization tree stratum index of a network device transmitting a received synchronization signal if the network device receives the received synchronization signal in the synchronization signal timeslot corresponding to synchronization tree stratum index lower than the synchronization tree stratum index of the network device.

26. The method of claim 21, wherein each of the synchronization signal timeslots are timeslots of a synchronization signal pattern cycle having a plurality of subcycles, wherein a first subcycle of the plurality of subcycles comprises synchronization signal timeslots corresponding to synchronization tree stratum levels including the synchronization signal timeslot corresponding to a synchronization tree stratum index of the first synchronization target network device and the synchronization signal timeslot corresponding to the synchronization tree stratum index of the network device, and wherein a second subcycle of the plurality of subcycles comprises synchronization signal timeslots corresponding to artificial stratum levels including the synchronization signal timeslot corresponding to an artificial stratum index.

\* \* \* \* \*

UNITED STATES PATENT AND TRADEMARK OFFICE
CERTIFICATE OF CORRECTION

PATENT NO.         : 10,244,495 B1
APPLICATION NO.    : 15/718492
DATED              : March 26, 2019
INVENTOR(S)        : Thong et al.

Page 1 of 1

It is certified that error appears in the above-identified patent and that said Letters Patent is hereby corrected as shown below:

In the Claims

At Column 30, Claim number 1, Line number 44, delete "comprising;" and replace with --comprising:--.
At Column 30, Claim number 1, Line number 63, delete "at a synchronization" and replace with --at synchronization--.
At Column 31, Claim number 1, Line number 1, delete "stratum, level" and replace with --stratum level--.
At Column 31, Claim number 4, Line number 30, delete "signal timeslot id" and replace with --signal timeslot k'--.
At Column 32, Claim number 11, Line number 14, delete "information 'from" and replace with --information from--.
At Column 32, Claim number 13, Line number 51, delete "k+1+/V" and replace with --k+1+N--.
At Column 32, Claim number 15, Line number 63, delete "N+1" and replace with --k'+1--.
At Column 33, Claim number 16, Line number 16, delete "timeslot N" and replace with --timeslot k'--.
At Column 33, Claim number 18, Line number 26, delete "comprising IN" and replace with --comprising 2N--.
At Column 33, Claim number 19, Line number 40, delete "timeslot, corresponding" and replace with --timeslot corresponding--.
At Column 34, Claim number 21, Line number 3, delete "de vice of the network de vice" and replace with --device of the network device--.

Signed and Sealed this
Fourth Day of June, 2019

Andrei Iancu
*Director of the United States Patent and Trademark Office*